US011325178B2

(12) United States Patent
Schneider et al.

(10) Patent No.: US 11,325,178 B2
(45) Date of Patent: May 10, 2022

(54) PRESSING TOOL FOR PRESSING FITTINGS FOR PRODUCING PIPE CONNECTIONS AND METHOD FOR PRESSING FITTINGS

(71) Applicant: Viega Technology GmbH & Co. KG, Attendorn (DE)

(72) Inventors: Andreas Schneider, Finnentrop-Schoenholthausen (DE); Dominik Kramer, Attendorn (DE); David Schmitt, Attendorn (DE); Jörg Rosenthal, Reichshof-Eckenhagen (DE); Markus Faulstich, Raunheim (DE); Nadine Riili, Lennestadt (DE); Detlev Schmitt, Drolshagen (DE); Uwe Grünkemeier, Kaarst (DE); Matthias Stahlschmidt, Plettenberg (DE)

(73) Assignee: Viega Technology GmbH & Co. KG, Attendorn (DE)

(*) Notice: Subject to any disclaimer, the term of this patent is extended or adjusted under 35 U.S.C. 154(b) by 0 days.

(21) Appl. No.: 16/651,886

(22) PCT Filed: Sep. 19, 2018

(86) PCT No.: PCT/EP2018/075274
§ 371 (c)(1),
(2) Date: Mar. 27, 2020

(87) PCT Pub. No.: WO2019/063369
PCT Pub. Date: Apr. 4, 2019

(65) Prior Publication Data
US 2020/0230686 A1    Jul. 23, 2020

(30) Foreign Application Priority Data
Sep. 29, 2017   (DE) .................... 10 2017 122 757.1

(51) Int. Cl.
*B21D 39/04*      (2006.01)
*F16L 13/14*      (2006.01)

(52) U.S. Cl.
CPC .......... *B21D 39/048* (2013.01); *F16L 13/141* (2013.01)

(58) Field of Classification Search
CPC ... B21D 39/048; B21D 39/046; F16L 13/141; B25B 27/10; B25B 27/00; B25B 27/02; Y10T 29/5367
(Continued)

(56) References Cited

U.S. PATENT DOCUMENTS

| 57,447 A * | 8/1866 | Stockmar ................ B25B 5/068 |
| | | 269/6 |
| 4,524,959 A * | 6/1985 | Kubo ................. B23K 37/0533 |
| | | 269/156 |

(Continued)

FOREIGN PATENT DOCUMENTS

| CN | 102909287 A | 2/2013 |
| CN | 104712860 A | 6/2015 |

(Continued)

*Primary Examiner* — Teresa M Ekiert
*Assistant Examiner* — Teresa A Guthrie
(74) *Attorney, Agent, or Firm* — The Webb Law Firm

(57) ABSTRACT

A pressing tool for pressing fittings to produce pipe connections, with two opposing pressing jaws, each having a pressing section and a lever section, and having a retaining element for swivel connecting the pressing jaws, wherein the pressing sections form a receiving section and wherein pressing the lever sections apart causes the receiving section to close. An actuator spindle, a spindle nut and at least two actuator levers are provided, and each actuator lever is swivel connected at one end to the lever section of a pressing jaw and each actuator lever is swivel connected at another (Continued)

end to the spindle nut. A method for pressing fittings for the production of pipe connections is also disclosed.

15 Claims, 17 Drawing Sheets

(58) Field of Classification Search
USPC ....... 72/416, 407, 409.01, 409.12, 454, 408, 72/370.25, 433, 434, 482.91, 481.3, 72/481.4; 29/237; 81/300–427.5
See application file for complete search history.

(56) References Cited

U.S. PATENT DOCUMENTS

| | | | |
|---|---|---|---|
| 5,206,980 A * | 5/1993 | Chapman | B23P 19/10 29/237 |
| 7,040,007 B2 * | 5/2006 | Shutts | H01R 43/0421 29/747 |
| 2012/0246902 A1 * | 10/2012 | Montena | H02G 1/14 29/426.6 |
| 2014/0360243 A1 | 12/2014 | MacAdams | |

FOREIGN PATENT DOCUMENTS

| | | |
|---|---|---|
| DE | 20303633 U1 | 5/2003 |
| DE | 20304385 U1 | 6/2003 |
| EP | 0791433 A1 | 8/1997 |
| EP | 2390057 A2 | 11/2011 |
| EP | 3381617 A2 | 10/2018 |

* cited by examiner

PRESSING TOOL FOR PRESSING FITTINGS FOR PRODUCING PIPE CONNECTIONS AND METHOD FOR PRESSING FITTINGS

CROSS-REFERENCE TO RELATED APPLICATIONS

This application is the United States national phase of International Application No. PCT/EP2018/075274 filed Sep. 19, 2018, and claims priority to German Patent Application No. 10 2017 122 757.1 filed Sep. 29, 2017, the disclosures of which are hereby incorporated by reference in their entirety.

BACKGROUND OF THE INVENTION

Field of the Invention

The invention relates to a pressing tool for pressing fittings to produce pipe connections, with two opposing pressing jaws, each having a pressing section and a lever section, and with a retaining element for swivel connecting the pressing jaws, wherein the pressing sections form a receiving section and wherein pressing the lever sections apart causes the receiving section to close. The invention also relates to a method for pressing fittings for the production of pipe connections.

Description of Related Art

The technical field relevant to this invention is the on-site installation of piping systems, in which a piping system consisting of pipe sections and fittings is generally installed for conducting a fluid. A fitting is generally understood to be a connecting piece of a pipe system and is most frequently used to connect two or more pipe sections. The fitting accordingly has two or more pressing sections. The most common fittings include straight connections, changes of direction in the form of pipe bends, reducers, branches such as T-pieces or crossings. However, a fitting is also a pipe connection of a valve or other component. For example, thermometers or manometers as valves have only one connection for one pipe section. Thus, this fitting then only has one pressing section to connect a pipe section to the fitting.

For the connection of the pipe sections with the fittings and other components press connections are used, in which a pressing section of a fitting is formed radially inwards using a pressing tool when the pipe section is inserted, so that a permanent and tight, possibly even non-detachable connection is produced. The fittings can be provided a sealant, for example an O-ring, which ensures the tightness of the connection, or with a direct contact between the materials of the pipe section and the fitting, for example a metallic seal.

Pressing technology for radial forming of the pressing section can be purely radially acting press systems or press systems that use radial-axial pressing, whereby part of the fitting is axially displaced during the pressing operation in order to effect radial forming. In addition, purely axial pressing techniques are also known.

In the US 2012/0246902 A1, a transverse compression tool for connecting connectors to coaxial cables is revealed, whereby axial compression is used.

In the US 57447 A2 a hand vice on the clamp is revealed.

The EP 0791433 A1 reveals an apparatus for installing clamping rings using radial compression.

The piping systems described above are used in particular to transport drinking or heating water, gas or oil for operating a heating system or media in industrial plants.

The fittings mentioned are usually pressed using a pressing tool. Pressing tools with two pressing jaws, which are hinged to each other, are known. The pressing jaws of such pressing tools usually have a lever section and a pressing section with pressing surfaces forming a receiving section. If a fitting is accommodated in the receiving section, press forces are transferred from the lever sections via the pressing section to the fitting.

The lever sections of the pressing tool can be pressed together or apart by hand or by connection with another tool. The majority of the tools used are complex electrical pressing tools. These are associated with high acquisition costs as well as costly maintenance, so that the pressing tools are not used for small quantities or with low purchasing power. The associated pressing jaws are also often oversized because of the pressing tools, as they are established for the pressing tool and not for the necessary press force of the fitting.

In addition, there are pressing tools that are operated by an actuator, such as a drill or a cordless screwdriver, or manually, but which are complicated to operate. It is well known that such a pressing tool only performs a pressing stroke in one direction of rotation and must be returned to its initial position before the next pressing stroke. Alternatively, before a change in direction of rotation such pressing tools must be manually switched for a next pressing stroke.

Fittings are usually established to provide a sufficiently tight pipe connection when they have been sufficiently pressed. However, with the pressing tools with rotary actuator described above, it is often not possible or difficult to determine whether sufficient press force has been exerted during a pressing operation.

The invention is therefore based on the technical problem of specifying a pressing tool and a method for pressing fittings for the production of pipe connections in a simple and cost-effective manner.

SUMMARY OF THE INVENTION

The task is solved according to the invention by an initially mentioned pressing tool by providing an actuator spindle, a spindle nut and at least two actuator levers, which can also be referred to as toggle levers, that each actuator lever is swivel connected at one end to the lever section of a pressing jaw and that each actuator lever is swivel connected at another end to the spindle nut.

Since the connection of the lever sections with an actuator lever and the connection of the actuator levers with the spindle nut can be swiveled, and since the spindle nut is movable along the axis of extension of the actuator spindle, movement of the spindle nut can cause the lever sections to be pressed apart and pressed together. For this purpose, the spindle nut is preferably moved by applying a torque to the actuator spindle.

For this purpose, the actuator spindle preferably has a connecting means at one end for a connection with a tool, whereby the tool is established to transmit a torque to the actuator spindle via the connecting means. This allows torques to be applied with different types of tools. A simple tool, for example, would be a hand crank with its longitudinal axis perpendicular to the direction of extension of the actuator spindle. This means that the pressing tool can be actuated by hand, regardless of the user's hand span.

Furthermore, it is preferred to form the end of the actuator spindle with a connection to an electrically operated tool, such as a cordless screwdriver or a drill, for example with a hexagonal form. This means that the pressing tool can be actuated by a motor with an electric tool that can also be used for other applications.

As a result of a movement of the spindle nut along the actuator spindle, the actuator levers first press the lever sections of the pressing jaws apart and then pull them together during the further movement, i.e. carry out a complete pressing stroke. Consequently, the movement of the spindle nut from an open receiving section causes the receiving section to close and open again. Thus, after a complete pressing stroke, a new complete pressing of a fitting can take place by switching the actuation direction. In particular, this has the advantage that further pressing can be carried out without the tool having to be returned to its initial position by an idle stroke.

The described motion sequence can also be described in such a way that in a first end position of the spindle nut the receiving section is open, in a press position of the spindle nut the receiving section is closed and in a second end position of the spindle nut the receiving section is open again. In the press position, the actuator lever is essentially perpendicular to the axis of the actuator spindle, while in the two end positions the actuator levers have an opposite angle, in particular a same but opposite angle to the axis of the actuator spindle. In this respect, a symmetrical actuator lever or toggle lever arrangement is preferred.

In the end positions, the pressing jaws are preferably opened so far that the pressing sections of the pressing jaws can be released from the then pressed fitting. This allows for a clear optical check whether the fitting to be pressed has been completely pressed. This is because the end position opposite to the initial end position can only be reached if the press position has been passed through in between.

In addition, the completeness of the pressing operation can be detectable for the user, especially in the case of a manual actuation of the pressing tool, but also in the case of a motor actuation, in which the exceeding of the maximum torque to be applied in the press position is detectable by a torque increase and a subsequent torque decrease. This is because the torque exerted can be felt directly by the user when holding the pressing tool, if necessary by means of a handle attached to the pressing tool.

A further advantage is that the pressing tool, solely due to the selected geometry, only transfers the press force to the fitting, which is intended for the intended pressing of a fitting by the geometry of the pressing sections. This ensures on the one hand that a tight pipe connection is produced and on the other hand that the fitting is prevented from being damaged by excessive press forces. Furthermore, too high or oversized actuator powers do not have a negative effect on the service life of the pressing tool. As a result, the pressing tool can be established to be force- and weight-optimized. In addition, the pressing tool can remain maintenance-free until the end of its service life.

The pressing jaws of the pressing tool can be made of any material, whereby a material with sufficient strength to avoid plastic deformation of the pressing jaws is preferred. The design of the pressing jaws with a material such as metal has the advantage that forces applied to the lever sections are transferred to the pressing sections in an efficient way.

Furthermore, it is preferred that the lever sections are longer than the pressing sections. Thus, with the use of a low force at the lever sections, a higher press force is transferred to the pressing sections.

The pressing sections form a receiving section for the reception of a fitting. The press contour of the receiving section is adapted to the external geometry of a specific or a variety of fittings. This means that press forces can be transferred to suit the fitting to be pressed. The pressing tool can be set up for radial or radial-axial pressing in relation to the direction of extension of the pipes to be connected.

The receiving section can also be established to receive a sliding sleeve and a corresponding element of the fitting for axial pressing of the fitting.

Preferably, the pressing jaws extend essentially along a longitudinal axis. However, it is also conceivable that the lever sections extend along a first longitudinal direction and that the pressing sections extend along a second longitudinal direction parallel to the first longitudinal direction. Therefore in the assembled state of the pressing tool, the pressing jaws would cross between the lever sections and the pressing sections in the manner of a pair of scissors.

Preferably the retaining element has at least one swivel axis, but in particular two swivel axes, in order to connect the pressing jaws to each other in a swiveling manner. For this purpose, the retaining element is arranged between the lever section and the pressing section of the respective pressing jaws. Therefore press forces can be transferred from the lever sections to the pressing sections by swiveling the pressing jaws.

In another embodiment of the pressing tool, a swiveling movement of the pressing jaws causes a symmetrical movement of the pressing sections. This is particularly advantageous if the fitting to be pressed has a rotationally symmetrical pressing surface.

The aforementioned task is also solved by a method for pressing fittings to produce pipe connections, in which a pressing tool with two pressing jaws forming a receiving section, in particular a previously described pressing tool, is used and in which the pressing tool is moved from a first end position via a press position to a second end position by applying a torque, the receiving section being open in the first end position and in the second end position and the receiving section being closed in the press position. This means that each time the pressing tool is moved from one end position to another end position, complete pressing is achieved. If the actuation direction is reversed, a new pressing operation can take place directly and the pressing tool does not have to be returned to its initial position.

The pressing tool is thus actuated alternately in two actuation directions by opposite torques. Thus, the spindle nut is moved from the first end position to the second end position by applying a first torque, and from the second end position to the first end position by applying a second, opposite torque. The same press forces are transmitted to the pressing sections of the pressing jaws irrespective of the direction of the torque applied. This facilitates the pressing of several fittings in a reliable manner.

In a further embodiment of the pressing tool, at least one spring stop is provided to suspend the movement of the spindle nut in an end position. The suspension can be established as a compression spring on the actuator spindle. In a corresponding embodiment of the method, the pressing jaws are suspended in the first end position and in the second end position. This generates a torque increase that is detectable for the user. Thus, the torque increase, which has nothing to do with the actual pressing of the fitting, can be easily detected by reaching an end position, i.e. a complete pressing.

In an alternative embodiment of the pressing tool, the end of the pressing operation can be detected by the fact that the actuator spindle has a threaded section and two subsequent threadless cylinder sections and that the spindle nut is disengaged from the threaded section when one of the two end positions is reached. In a corresponding embodiment of the method, the spindle nut is disengaged from the thread of the drive spindle when reaching an end position.

Thus the spindle nut is no longer actuated in an end position and the end of a pressing operation can be easily detected. In addition, this means that when the spindle nut is moved from one end position to another end position, there is only one maximum torque. This can, for example, protect a cordless screwdriver connected to the pressing tool, thus extending the battery life.

Springs may also be provided at the first and second ends of the actuator spindle. This allows the spindle nut to be automatically re-threaded when switching between two opposite torques on the thread of the actuator spindle.

In another embodiment of the pressing tool, the retaining element has a spring element for the suspension of the pressing jaws. The spring element is preferably at least partially made of a polymer material and carries the bearing of the at least one axis for the swiveling connection of the pressing jaw to the holder. In addition to an embodiment made of an elastic material, metal springs can also be used. The use of the spring element enables a mechanically particularly simple and compact design of the pressing tool with improved press properties.

Furthermore, at least one spring means may be provided for the suspension of the connection between the spindle nut and the actuator levers and/or for the suspension of the connection between the actuator levers and the pressing jaws and/or between the holder and the pressing jaws, in particular for the suspension of the bolts in the holder. The spring medium can, for example, be a spiral spring, a disc spring or an elastomer spring. This enables a compensation of the transmitted press forces in the plane of symmetry of the pressing jaws. This allows complete and proper pressing of the fitting, regardless of any deviations in the shape of the fitting within production tolerances, the setting behavior of the mechanics of the pressing tool or the wear of the pressing tool.

The arrangement of the spring means described above compensates the press forces before the press forces are transmitted from the spindle nut through the swiveling connections to the actuator levers or through the actuator levers to the lever sections of the pressing jaws. This relieves the swiveling connections of directional differences in the press forces, which can increase the service life of the pressing tool.

As already explained above, it is preferred that the geometry of the pressing tool is axially symmetrical along the longitudinal axis of the actuator spindle. This allows a particularly simple production and a simple construction of the pressing tool. Furthermore, it can be easily ensured that the fitting is pressed equally by the two pressing jaws.

In another embodiment of the pressing tool, the actuator levers are bent, in particular C-shaped. The actuator levers thus have an increased elasticity in the extension direction between the connections with the lever section and the spindle nut compared to essentially straight actuator levers. This allows production tolerances of the fitting to be pressed to be compensated by targeted deformation of the actuator levers.

It is also conceivable to equip the pressing tool with side plates that allow the tolerance compensation described above. This can be achieved by targeted use of the elastic material properties, e.g. of a metal. Another influencing factor is the geometry of this side plate.

Furthermore, the effects described above can be used for tolerance compensation via the pressing jaws. Irregularities in the shaping of fittings within a production tolerance can thus be compensated by corresponding deformation of the pressing jaws. However, the elasticity of the pressing jaws must be adjusted so that the fitting is pressed reliably. Preferably, a quenched and tempered tool steel with a hard surface and an elastic core, for example made of a plastic, is used as the material.

In a corresponding embodiment of the method, a production tolerance of a pipe joint is compensated by the suspension of a joint and/or by the shaping of the actuator levers, the joint being a joint between the pressing jaws, a joint between an actuator lever and a lever section and/or a joint between an actuator lever and the spindle nut.

Fittings can thus be completely pressed, even if the fittings to be pressed have different outside diameters or other dimensions within a production tolerance.

For a further embodiment of the pressing tool described above, it is intended that the pressing jaws are connected to each other via a ratchet mechanism. The ratchet mechanism is used to perform a pressing stroke, i.e. the movement of the spindle nut from one end position to the other end position, without reversing the movement. If the direction of spindle rotation is changed prematurely, the pressing tool blocks due to the connection by the ratchet mechanism, therefore retraction is not possible. After pressing, i.e. at least after exceeding the middle press position of the spindle nut and subsequently reaching the end position, the pressing tool can be moved to the end position and removed from the fitting. Changing the direction of rotation then starts a new pressing operation. The positioning of the ratchet mechanism between the two pressing jaws ensures that the ratchet function is independent of the direction of rotation of the spindle.

The corresponding method is characterised by the steps of maintaining an intermediate position reached from the first end position to the second end position or from the second end position to the first end position when the pressing tool is moved.

An alternative embodiment of the pressing tool to ensure a complete pressing operation is that the spindle nut has a housing and an inner nut and that the spindle nut is adapted for an overrunning clutch or freewheel in two actuation directions.

In a first configuration, which can be described by the term "pulling inner nut", the inner nut is held under a first freewheel by means of an axial lock. This locks in the actuation direction of the actuator spindle. The housing performs an axial movement along the actuator spindle and presses the fitting via the described lever mechanism. If the direction of rotation is changed prematurely, the freewheel is released and the inner nut rotates with the spindle on the spot without producing a backward or opening movement along the actuator spindle.

When the end position of the housing is reached with the correct direction of rotation, the inner nut is released from the axial locking while continuously engaging in the first freewheel and pressed axially into a second freewheel and into a corresponding locking. The inner nut gets disengaged from the first freewheel and the inner nut rotates idle. When the direction of rotation is changed, the second, then engaged, freewheel locks and actuates the mechanics in the opposite axial direction.

The axial locking of the inner nut with the housing can be unlocked force-controlled, e.g. via a clamping ring in a groove or spring-loaded thrust pieces. The release mechanism can also be activated when the respective end position is reached.

In a second embodiment, which can be described by the term "sliding inner nut", the inner nut transmits the thrust force via a contact surface or stop at the end of the housing, e.g. a cover. To start, the inner nut is located on a spindle section without thread, i.e. a cylinder section, and a cylindrical spring is used for threading. The inner nut executes an axial movement in the housing from a first released freewheel into a second disengaging freewheel up to the stop in the housing. The housing can also perform an axial movement. The relative movement of the inner nut in the housing is completed at the latest when a counterforce builds up through contact with the fitting. Now the actual pressing begins.

If the direction of rotation is changed prematurely, the second freewheel releases and the inner nut rotates with the spindle on the spot without producing a backward or opening movement. When the end position is reached with the correct direction of rotation, the inner nut runs off the thread and into the cylinder section, as mentioned above in the description of the starting position. When changing the direction of rotation, the nut threads in again and a new pressing of a fitting can be started.

The assigned method is such that a complete pressing of a pipe connection is achieved by using an overrunning clutch.

The advantage of the double overrunning clutch or double freewheel is that a complete pressing of a fitting is guaranteed. If the direction of spindle rotation is changed too early, the respective locked freewheel is released and the spindle rotates at idling speed without causing a stroke movement. Thus it is forced to maintain a direction of rotation once started until at least the press position has been passed or until the opposite end position has been reached.

BRIEF DESCRIPTION OF THE DRAWINGS

Description of the Invention

Further features and advantages of this invention result from the following description of several embodiments, whereby reference is made to the attached drawing. Shown in the drawings.

In the following description of the different embodiments according to the invention, the same components are provided with the same reference signs, even if the components may differ in their dimensions or shape in the different embodiments.

Figure 1A:
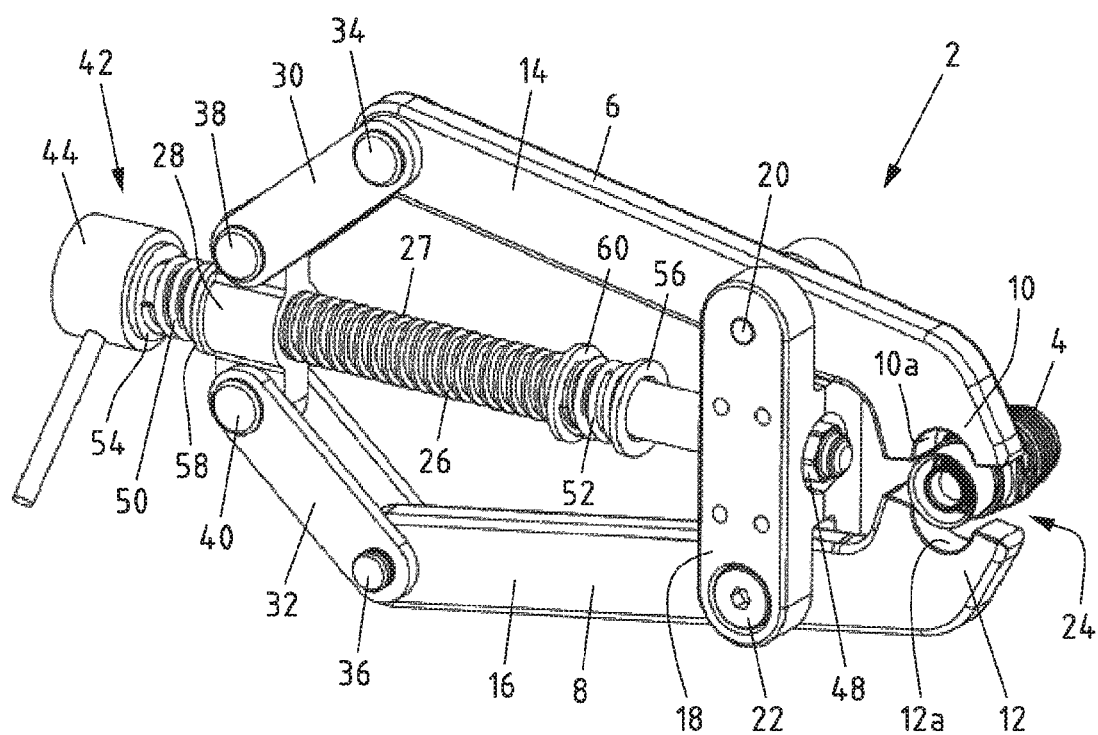
FIG. 1a-d a first embodiment of a pressing device according to the invention for the pressing of fittings for the production of pipe connections in three different positions of a pressing stroke, FIG. 2 a second embodiment of a pressing device according to the invention, FIG. 3a, b a third embodiment of a pressing device according to the invention, FIG. 4a-c a fourth embodiment of a pressing device according to the invention, FIG. 5a-c a fifth embodiment of a pressing device according to the invention, FIG. 6a-e a sixth embodiment of a pressing device according to the invention, FIG. 7 a seventh embodiment of a pressing device according to the invention, FIG. 8 an eighth embodiment with a handle, FIG. 9a-b in the ninth embodiment with a housing, FIG. 10a-e a tenth embodiment of a pressing device according to the invention and FIG. 11a-e an eleventh embodiment with a pressing section for axial pressing of a fitting.
Figure 1B:
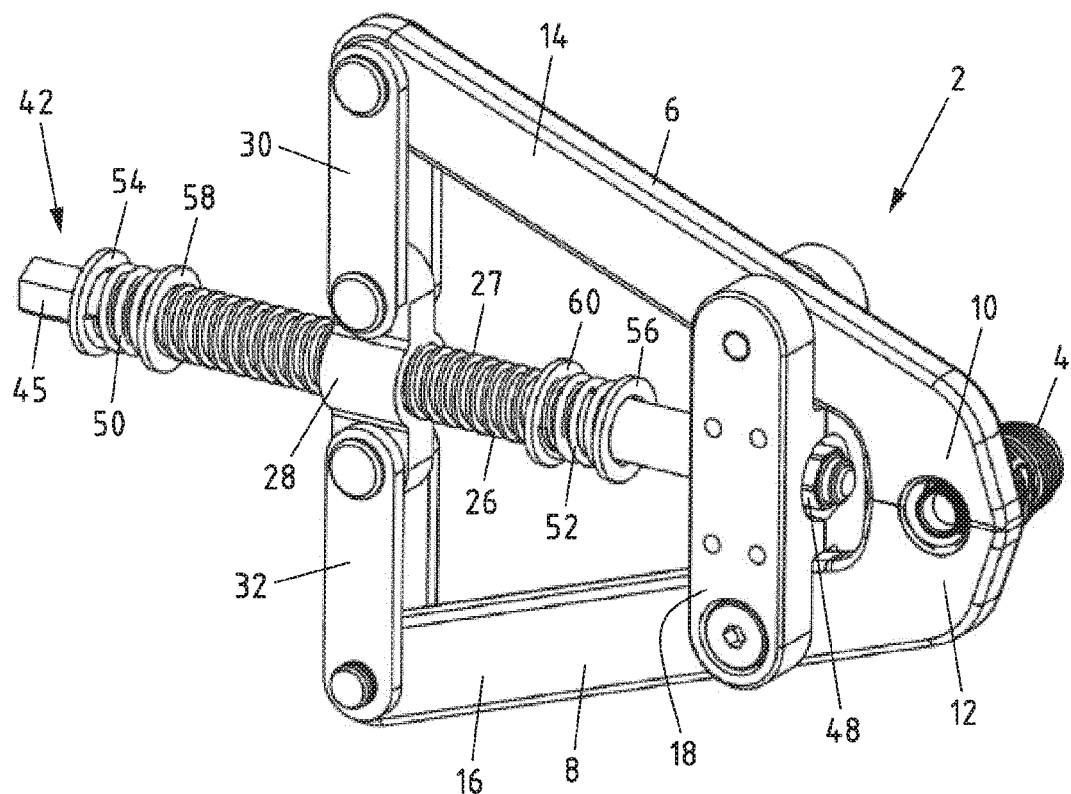
Figure 1C:
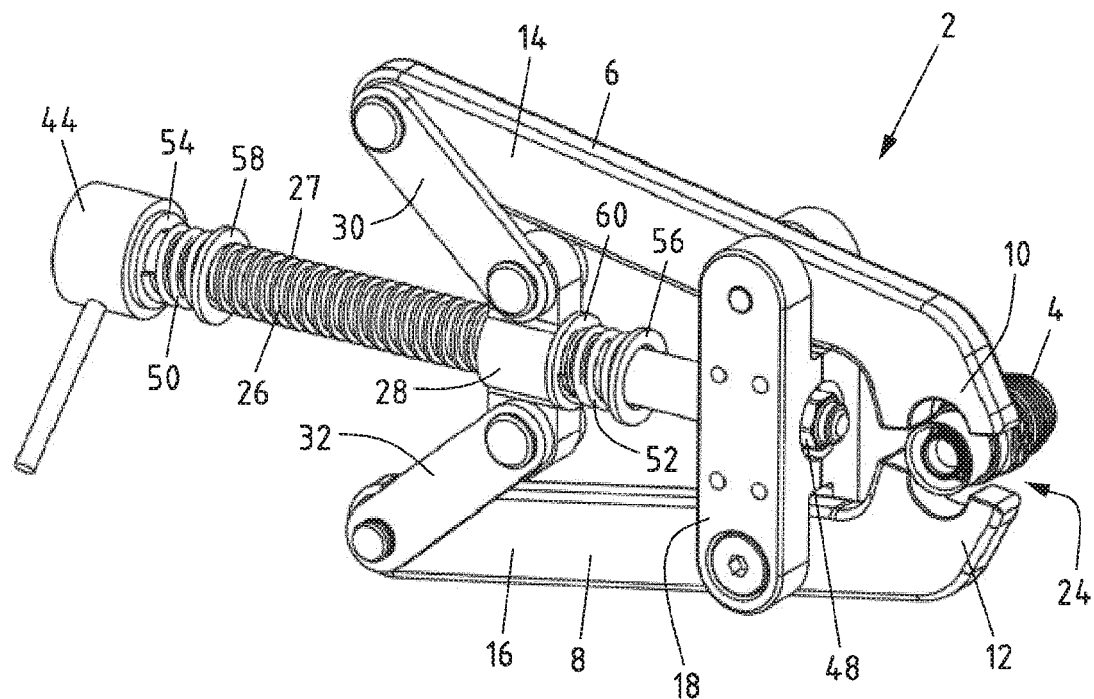

FIGS. 1a to 1c show a pressing tool 2 for pressing fittings 4 to produce a pipe connection, wherein the corresponding pipe is not shown in FIG. 1.

The pressing tool 2 has two opposite pressing jaws 6 and 8, each with a pressing section 10, 12 and a lever section 14, 16. One retaining element 18 connects the pressing jaws 6 and 8 by means of two bolts 20 and 22, which can be swiveled. The pressing sections 10, 12 form a receiving section 24 in which the fitting 4 is incorporated. The pressing sections 10, 12 have an inner surface 10a, 12a with a press contour adapted to the outer contour of the fitting 4.

Due to the geometry of the pressing tool 2 shown, pressing the lever sections 14, 16 apart causes a closing or the pressing sections 10 and 12 and thus of the receiving section 24.

According to the invention, an actuator spindle 26, a spindle nut 28 and two actuator levers 30, 32, which can also be referred to as toggle levers, are provided. The actuator spindle 26 has an external thread 27.

Each actuator lever 30, 32 is swivel connected at one end to the lever section 14, 16 via a bolt 34, 36 acting as a rotary axis with one of the pressing jaws 6, 8. In addition, each actuator lever 30, 32 is swivel connected at another end to the spindle nut 28 via a bolt 38, 40 acting as a rotary axis.

A hand crank 44 is provided at one free end 42 of the actuator spindle 26, which is connected to the actuator spindle 26 via an internal hexagon with an external hexagon 45. This allows a manually generated torque to be applied to the actuator spindle 26. The other end of the actuator spindle 26 is rotatable mounted in a bearing 48 within the retaining element 18.

In a first end position of the spindle nut 28, which is shown in FIG. 1a, the distance between the lever sections 14, 16 is large or maximum, so that the pressing sections 10, 12 are spaced apart and the receiving section 24 is open. Thus the fitting 4 to be pressed can be arranged in the receiving section 24.

By rotating the hand crank 44, the spindle nut 28 is moved along the actuator spindle 26 until, in an intermediate stage shown in FIG. 1b, a press position of the spindle nut 28 is reached, in which a maximum distance between the pressing sections 14, 16 and thus the closed position of the pressing sections 10, 12 is achieved. In the press position, the actuator levers 30, 32 are essentially perpendicular to the axis of the actuator spindle 26. The pressing sections 10, 12 then adjoin each other or have a minimum distance to each other, the receiving section 24 is closed and the fitting 4 is completely pressed.

By rotating the crank handle 44, a second end position of the spindle nut 28 as shown in FIG. 1c is reached, in which the distance between the lever sections 14 and 16 is again greater or maximum. The receiving section 24 is open again and the pressing tool 2 can be removed from the pressed fitting 4.

Thus a method for pressing fittings 4 for producing pipe connections can be carried out, in which a pressing tool 2 with two pressing jaws 6, 8 forming a receiving section 24 is used and in which the pressing tool 2 is moved from a first end position via a press position to a second end position by application of a torque, wherein in the first end position and in the second end position the receiving section 24 is open and wherein in the press position the receiving section 24 is closed.

Furthermore, the pressing tool can be actuated alternately in two actuation directions by opposite torques, so that after each change of the actuation direction a new pressing of a fitting 4 can be carried out.

The pressing tool 2 shown in FIG. 1 is established symmetrically to the axis of the actuator spindle 26, so that a swiveling movement of the pressing jaws 6, 8 causes a symmetrical movement of the pressing sections 10, 12. The symmetry can be seen in the two FIGS. 1a and 1c from the fact that the respective angle between the actuator levers 30, 32 and the actuator spindle 26 is opposite, but the amount is essentially the same. Moving the spindle nut 28 back and forth then results in two almost identical pressing operations. Due to mechanical play or other inaccuracies, the motion sequences are only identical in the ideal case.

The following measures are taken to detect the end of a pressing operation.

As shown in FIGS. 1a and 1c, two spring stops consisting of a cylindrical spring 50, 52 and stops 54, 56 as well as two stop rings 58, 60 are provided for the suspension of the movement of the spindle nut 28 in each of the two end positions. This means that when the end position is reached, the torque to be applied is greatly increased and an end of the respective pressing operation can be detected by the user. In FIG. 1b these details have been omitted for the sake of clarity.

Figure 1D:
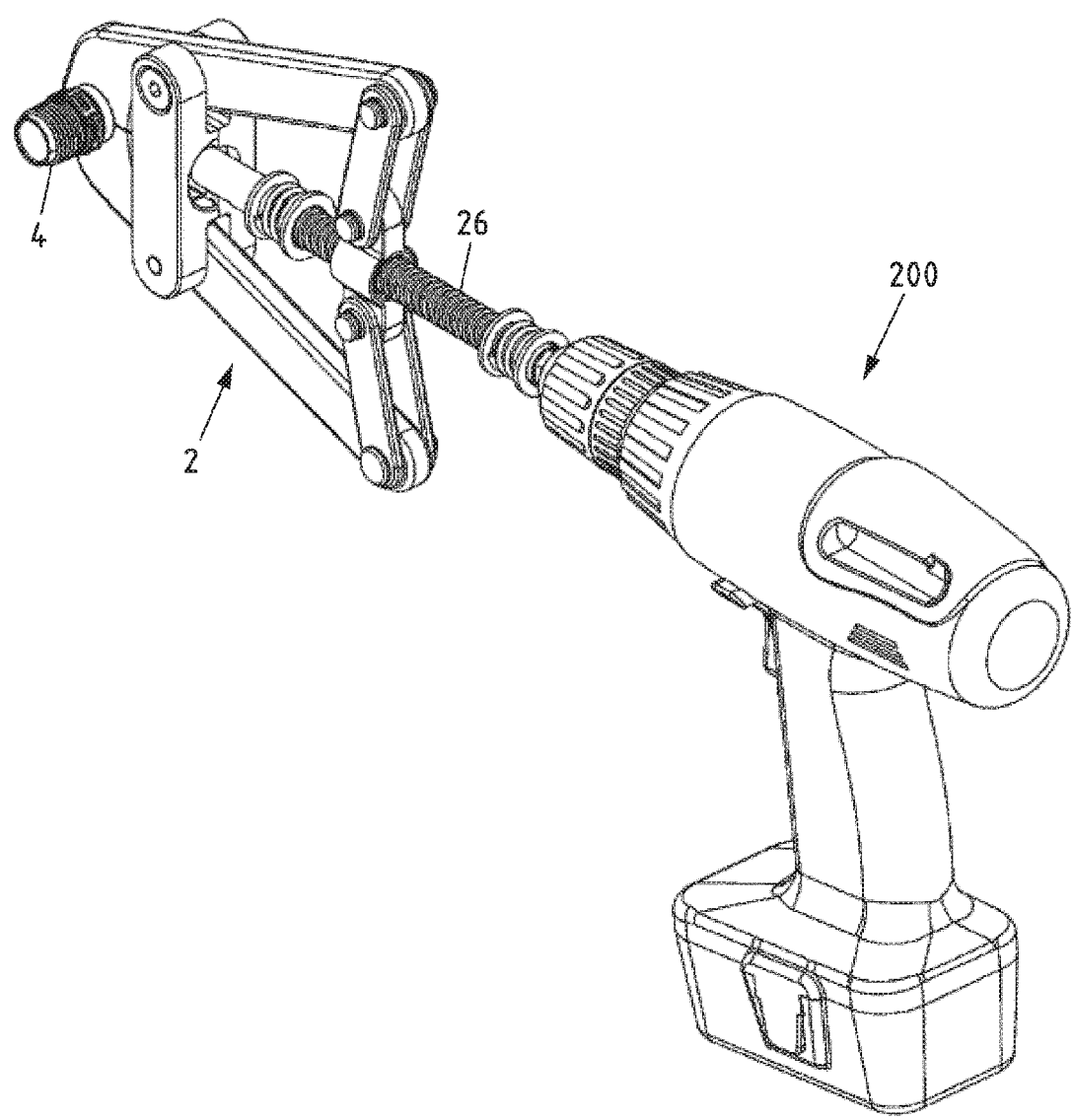

FIG. 1d shows the previously described pressing tool 2 which is connected to a cordless screwdriver 200 which actuates the actuator spindle 26 in two different directions of rotation.

Figure 2:
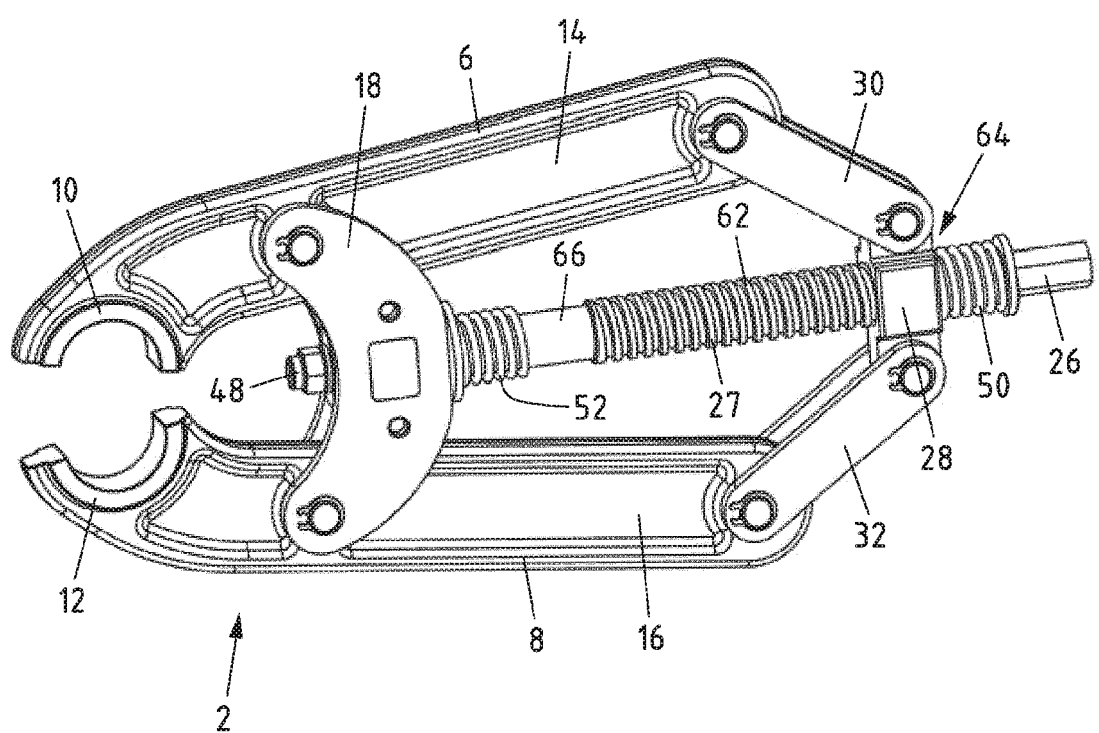

A further possibility of recognizing the end of a pressing operation is shown in FIG. 2. Here is another embodiment of a pressing tool 2 is shown, where the same components, as explained in FIG. 1, have the same reference signs.

In contrast to FIG. 1, the retaining element 18 has a curved shape, so that the bearing 48 has a larger distance to the pressing sections 10, 12 with otherwise the same geometry and the lever sections 14, 16 can be extended without the length of the actuator levers 30, 32 having to be increased.

According to FIG. 2, the actuator spindle 26 has an external thread 27 in the form of a thread section 62 and two subsequent threadless cylinder sections 64, 66. This causes the spindle nut 28 to disengage from the thread section 62 when one of the two end positions is reached. A further rotation of the actuator spindle 26 then no longer effects an advancement of the spindle nut 28 and the end of the pressing operation becomes clear.

As already explained in connection with FIG. 1, the cylindrical springs 50, 52 cause the spindle nut 28 to be pressed in the direction of the thread section 62, so that when the direction of rotation of the actuator spindle 26 is reversed, the spindle nut 28 again engages the thread section 62.

Figure 3A:
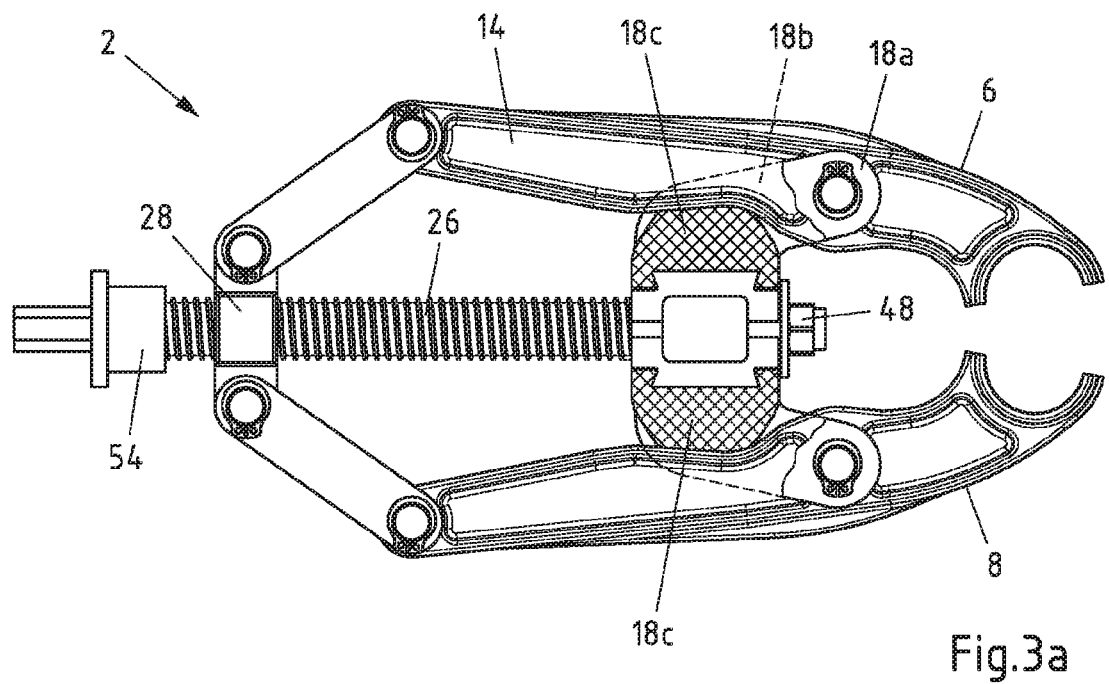
Figure 3B:
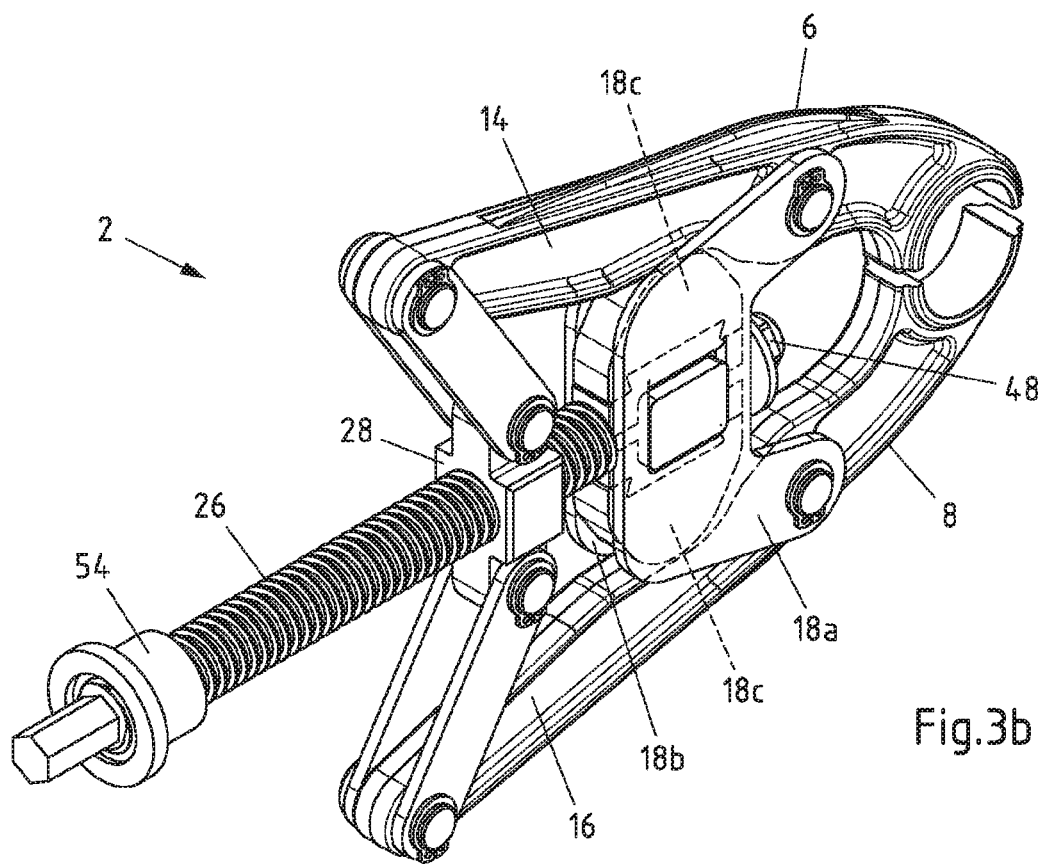

Another way of detecting the end of a pressing operation is shown in FIG. 3a and FIG. 3b. An elastic element 18c is arranged between the spindle bearing 48 and the respective pressing jaws 6, 8, e.g. an elastomer spring or a compression spring. This element is arranged between the outer mounting plates 18a and 18b in such a way that a force can be transmitted to the lever sections 14, 16. The force build-up is caused by the elastic deformation of the spring element.

At the moment of pressing, see FIG. 1b, the generated force is minimal, preferably equal to zero. When the spindle nut 28 is moved to one of the two end positions according to FIG. 3a or FIG. 3b, the force increases and reaches the maximum force in the respective end positions. Similar to the concept described above, the torque required to rotate the actuator spindle 26 increases during this technical implementation and the end of the pressing operation can be determined by the user.

Figure 4A:
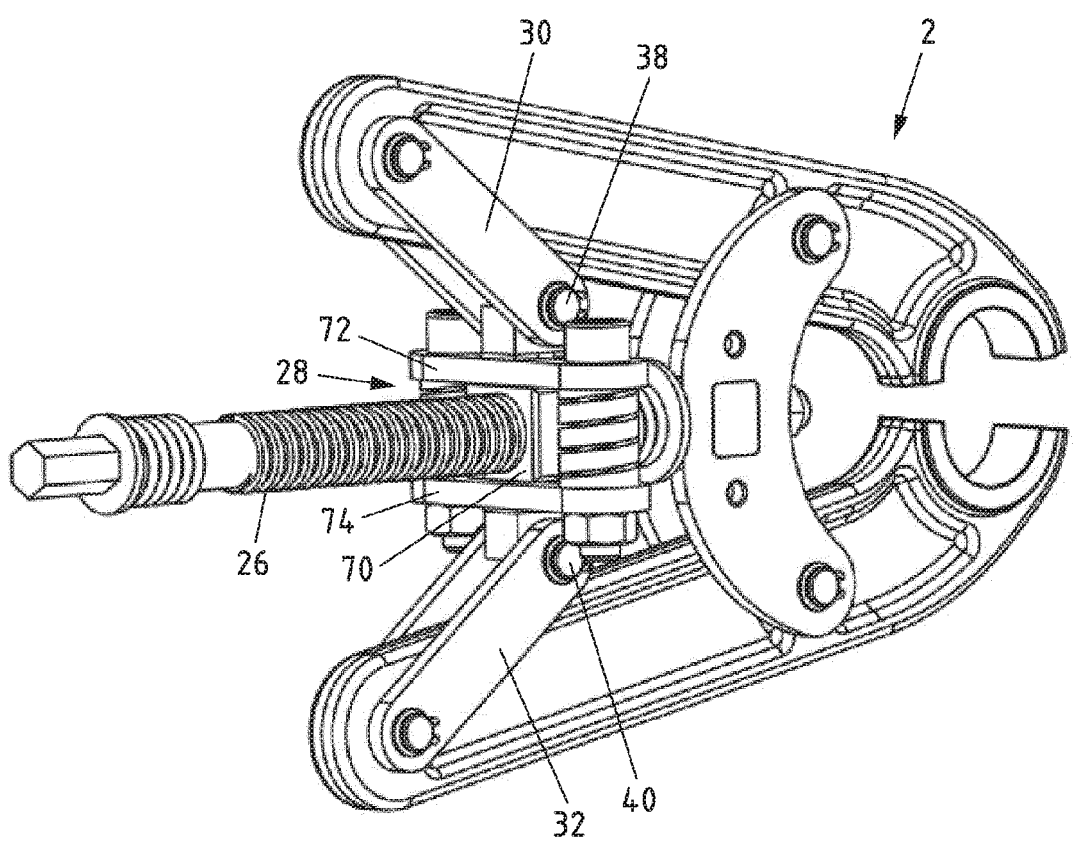
Figure 4B:
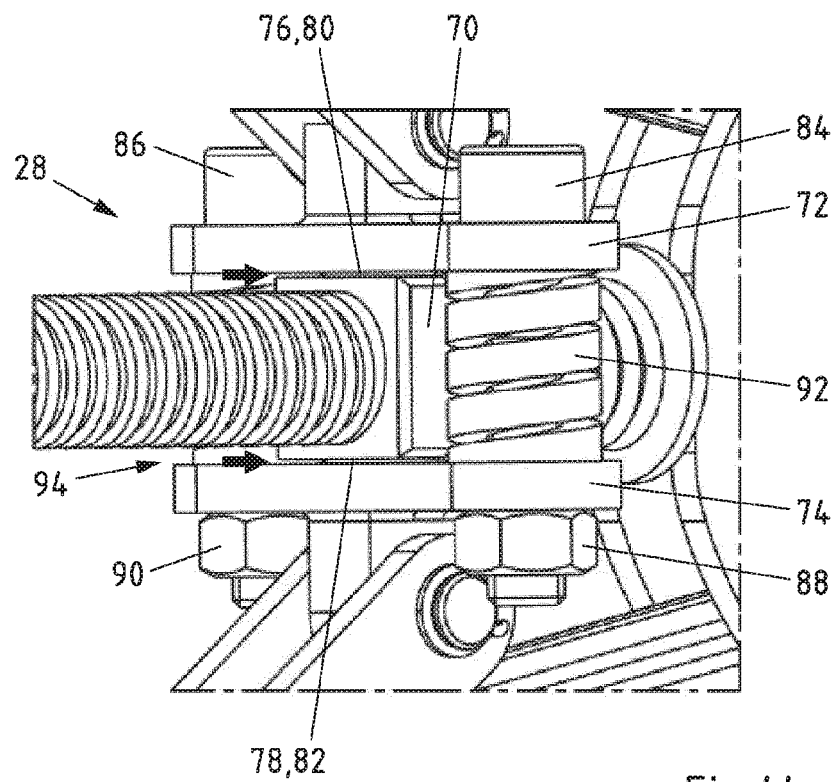
Figure 4C:
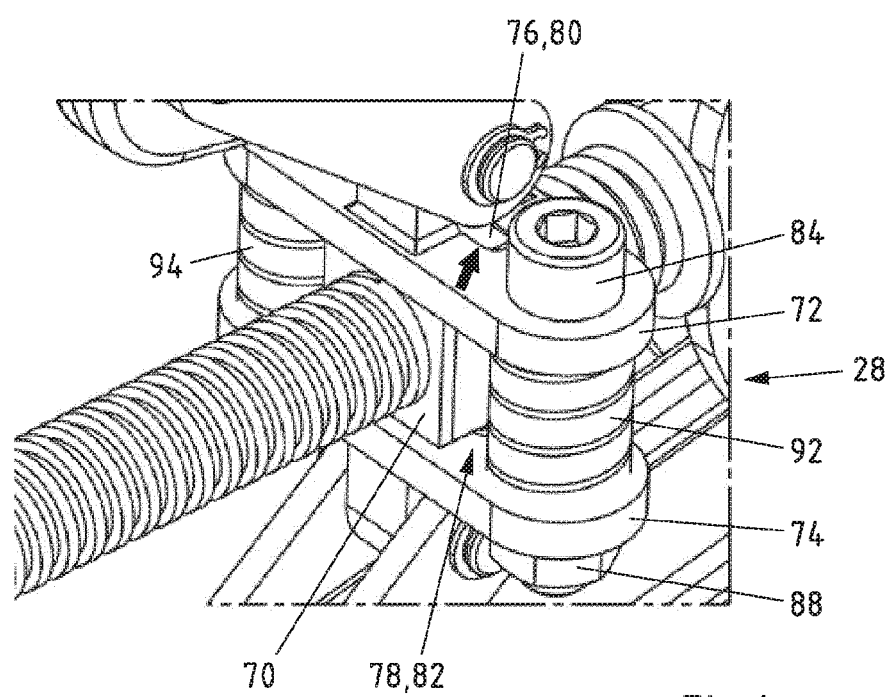

FIGS. 4a to 4c show a further embodiment of a pressing device 2 according to the invention, in which an elastic suspension of the actuator levers 30, 32 with respect to the actuator spindle 28 is realized.

The spindle nut 28 has the following elements. An inner nut 70 is arranged between two retaining elements 72, 74, whereby the actuator levers 30, 32 are articulated to the retaining elements by means of bolts 38, 40. The nut 70 has two webs 76, 78, each projecting in the direction of the retaining elements 72, 74, which are accommodated in slots 80, 82 in the retaining elements 72, 74 for guiding the nut 70. This is illustrated in FIG. 4c with a small arrow.

The two retaining elements 72, 74 are connected to each other by screws 84, 86 and nuts 88, 90 and are pressed apart by cylindrical springs 92, 94. The dimensions of the inner nut 70 and the arrangement of the retaining elements 72, 74 are selected so that there is a mechanical play between the nut 70 and the retaining elements 72, 74, which is illustrated by the two arrows in FIG. 4b.

During the movement of the spindle nut 28 along the actuator spindle 26, the greatest forces are exerted on the actuator levers 30, 32 and the spindle nut 28 in the section of the press position. Since the geometry of the pressing device 2 is established for a fitting with predetermined dimensions, the springs 92, 94 and the provision of the clearance described can automatically compensate for dimensional changes or tolerances of the fitting during operation, without excessive loading of the pressing tool. Factory presettings, as with known stroke-controlled pressing tools, are not required.

The embodiment shown in FIG. 4 thus implements a pressing device 2 with two spring means in the form of springs 92, 94 to suspend the connection of the spindle nut 28 with the actuator levers 30, 32.

In the same way, without it being shown in the figures, for the suspension of the connection between the actuator levers 30, 32 and the pressing jaws 6, 8 and/or between the retaining element 18 and the pressing jaws 6, 8, a configuration of the connection according to FIG. 4 can be provided.

Figure 5A:
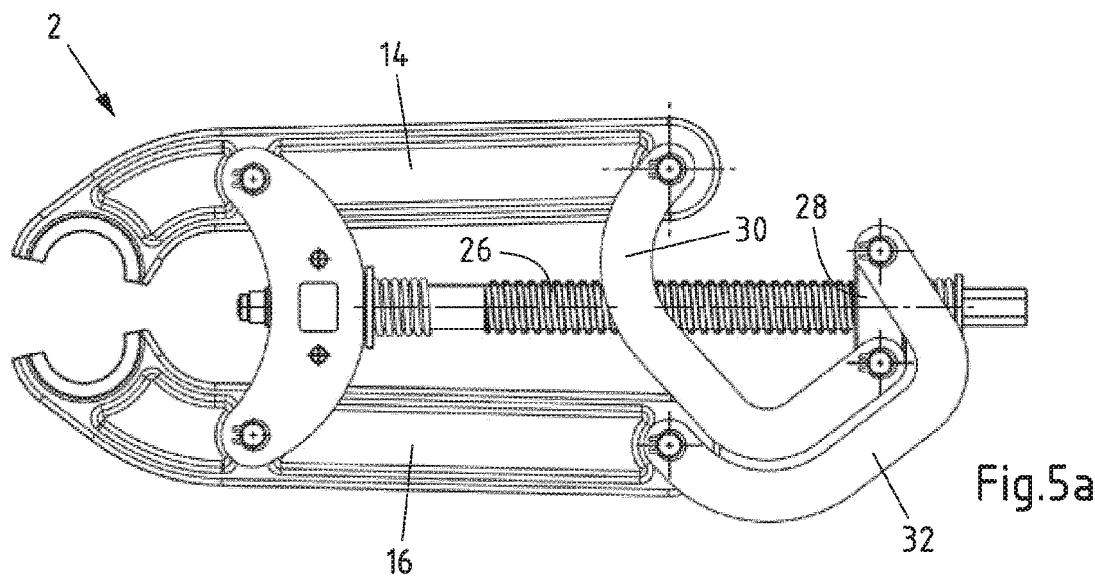
Figure 5B:
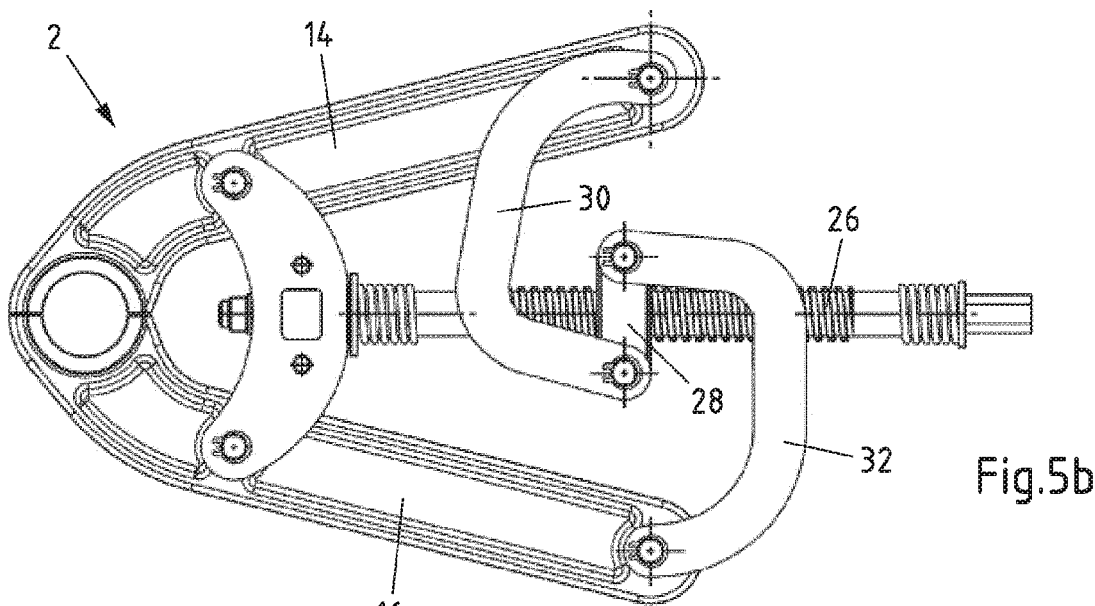
Figure 5C:
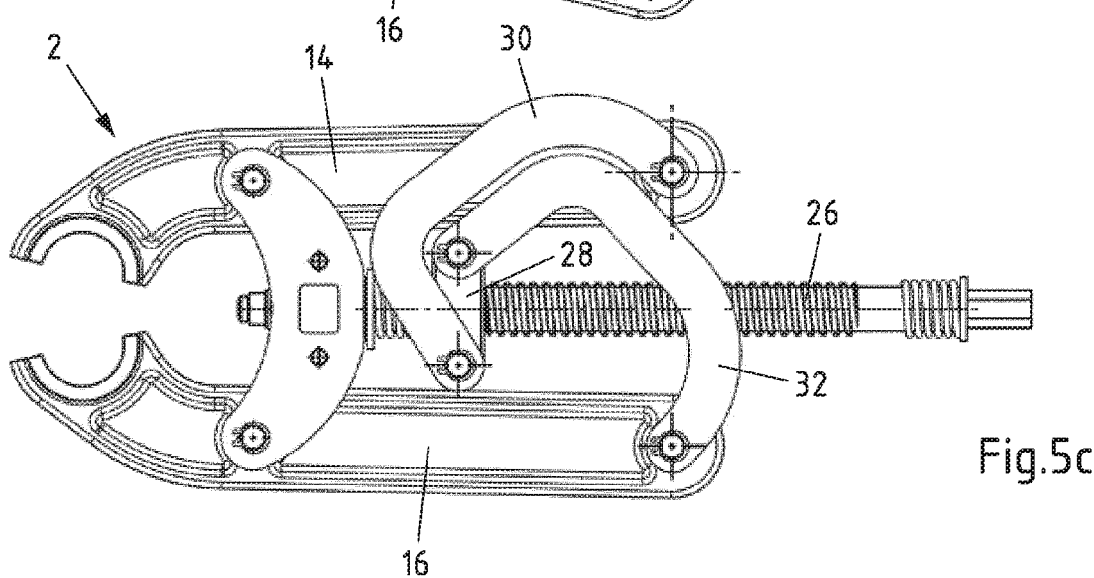

A further possibility for automatic compensation of deviations in the dimensions of the fitting to be pressed is provided by the embodiment shown in FIGS. 5a to 5c. The pressing tool 2 according to FIG. 5 has the same components as described in the previous embodiments.

In contrast to the other embodiments, in which the geometry of the pressing tool 2 is axially symmetrical over the longitudinal axis of the actuator spindle 28, the actuator levers 30, 32 are curved and essentially C-shaped. In this embodiment, the spindle nut 28 also occupies two end positions according to FIGS. 5a and 5c, between which the spindle nut 28 is moved by rotating the actuator spindle 26.

The effect of the curved shape of the actuator levers 30, 32 comes into effect in the press position shown in FIG. 5b. In the press position, the strongest forces of the lever sections 14, 16 act in the direction of the actuator spindle 26. If the forces are too high due to too large dimensions, e.g. due to unfavorable tolerances of the fitting 4 to be pressed, the actuator levers 30, 32 can deform due to the curved shape and yield to the forces. In other words, pressing the C-shape together results in force or tolerance compensation.

In the further embodiment of a pressing device shown in FIGS. 6a to 6e, a mechanism is realized which ensures a complete passage of a pressing stroke.

Figure 6A:
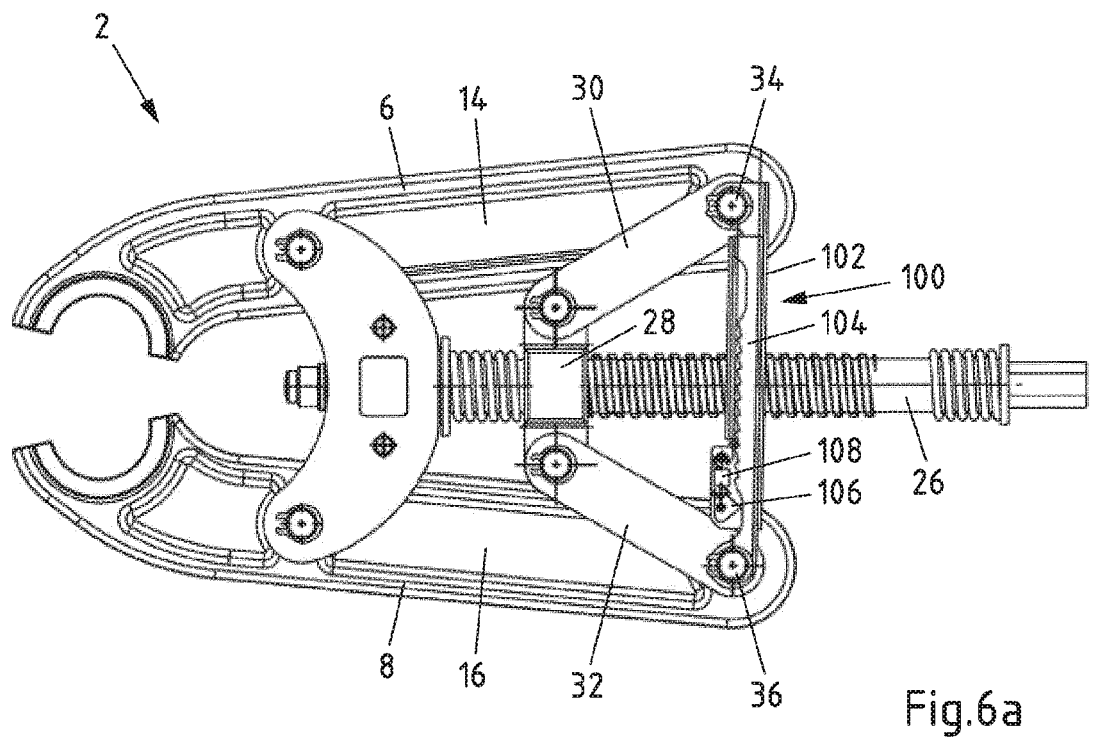
Figure 6B:
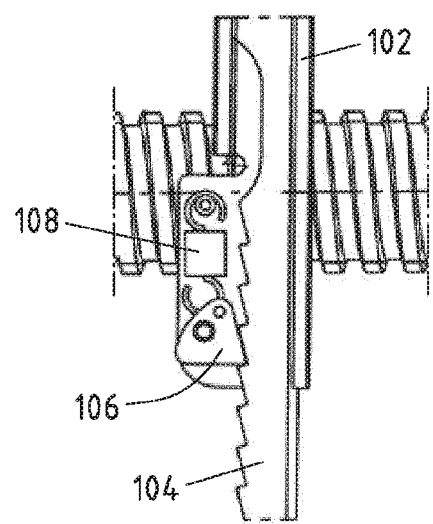
Figure 6C:
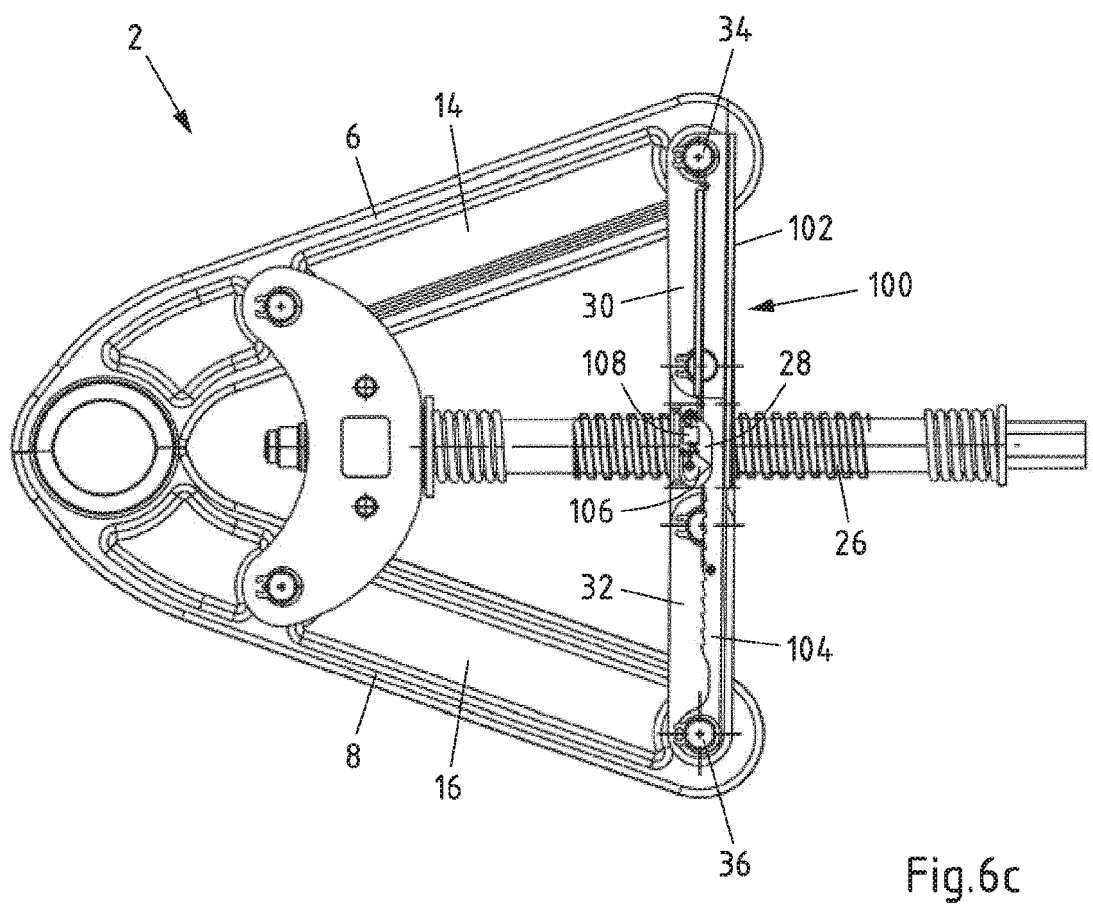
Figure 6D:
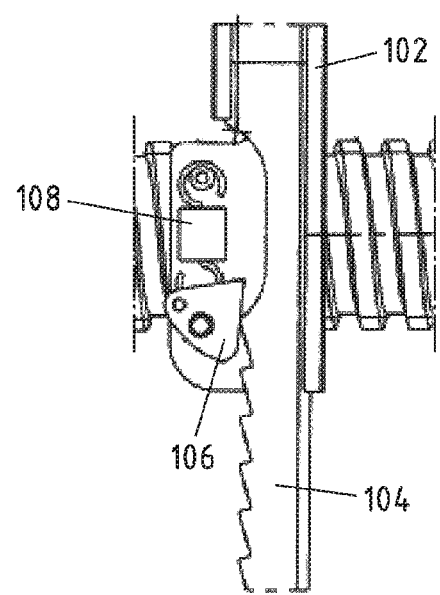
Figure 6E:
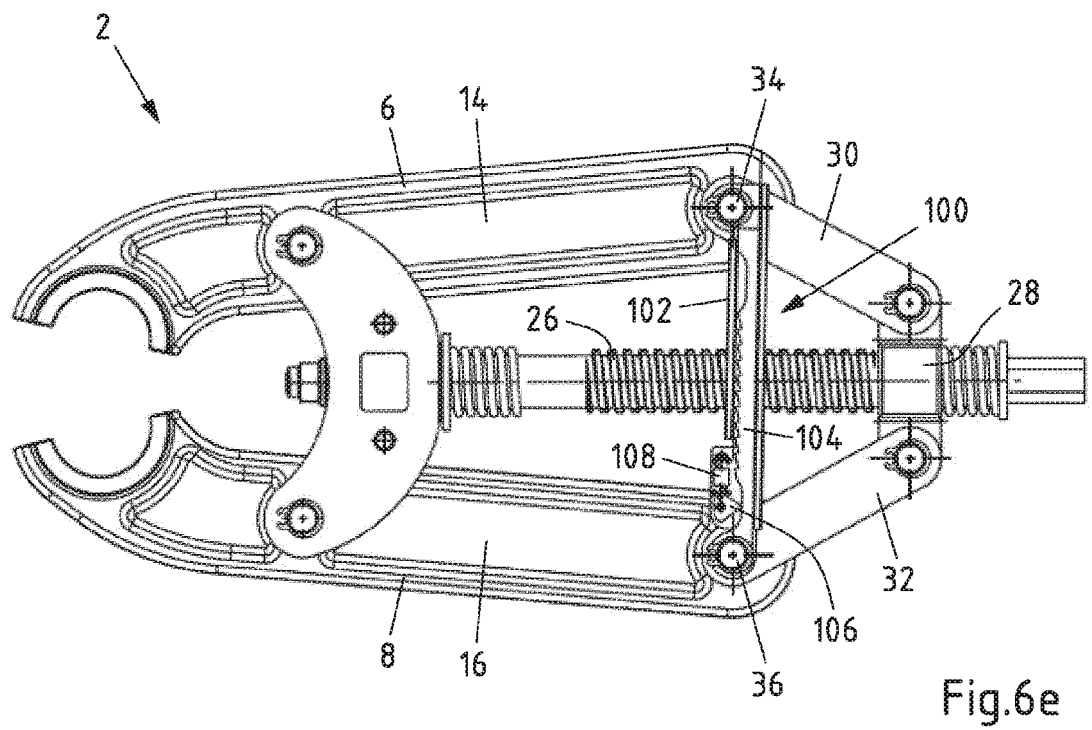

The pressing tool 2 according to FIGS. 6a, 6c and 6e has the same components as already explained in the previously explained embodiments. Therefore the same reference signs designate the same elements as before.

In addition to the previous elements, the pressing jaws 6, 8 are connected to each other by a ratchet mechanism 100, using the same bolts 34, 36 which are used to connect the lever sections 14, 16 with the actuator levers 30, 32. The ratchet mechanism 100 has a guide rail 102 and a rack 104, with the guide rail 102 connected to the upper lever section 14 and the rack 104 connected to the lower lever section 16 as an example. Within the guide rail 102, a ratchet element 106 is rotatable mounted and preloaded by means of a spring 108.

In the first end position according to FIG. 6a, the guide rail 102 and the rack 104 are pressed together and the ratchet element 106 does not engage with the rack 104. When the actuator spindle 26 is rotated and the spindle nut 28 is moved, the ratchet element 106 engages with the rack 104, as shown in FIG. 6b. By this engagement, the ratchet mechanism 100 blocks against a reversal of the movement of the spindle nut 28, since the ratchet element 106 is blocked by the engagement with the rack 104.

When the press position shown in FIG. 6c is reached, the ratchet element 106 is disengaged from the rack 104. When the spindle nut 28 continues to move, the ratchet element 106 is re-engaged from the rack 104, as shown in FIG. 6d. Since complete pressing has been achieved, the ratchet has no locking effect until it reaches the end position according to FIG. 6e. In the second end position according to FIG. 6e, the ratchet mechanism 100 takes the starting position as in the first end position according to FIG. 6a. A new pressing stroke can thus be started.

The ratchet mechanism 100 thus prevents the movement of the spindle nut 26 from being reversed during the pressing phase of the pressing sections 10, 12. A complete pressing of the fitting 4 is thus ensured.

The shape of the teeth of the rack 104 is asymmetrical, so that in the position according to FIG. 6d the rack 104 can no longer block the ratchet element 106. Thus the movement of the spindle nut 28 after passing through the press position according to FIG. 6c can be reversed without reaching the second end position according to FIG. 6e.

Figure 7:
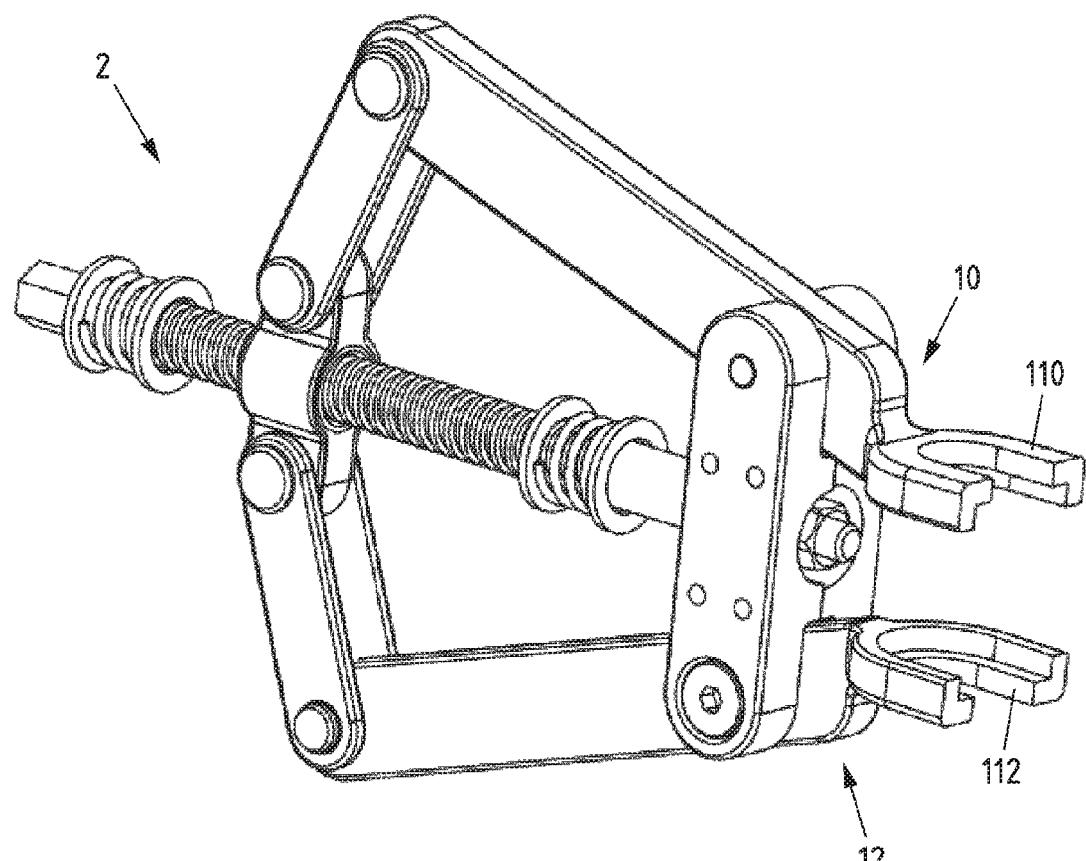

FIG. 7 shows an embodiment of a pressing device 2 with modified pressing sections 10, 12, which are established as sleeve holders 110, 112 and are suitable for fittings in which axial displacement of a pressing sleeve results in a pressing of the fitting. The sleeve holders 110, 112 move essentially linear towards and away from each other during the advancement of the spindle nut. Essentially linear means that the sleeve holders 110, 112 themselves participate in a rotary movement, but due to the small angular section this movement can be almost equated to a linear movement.

Figure 8:
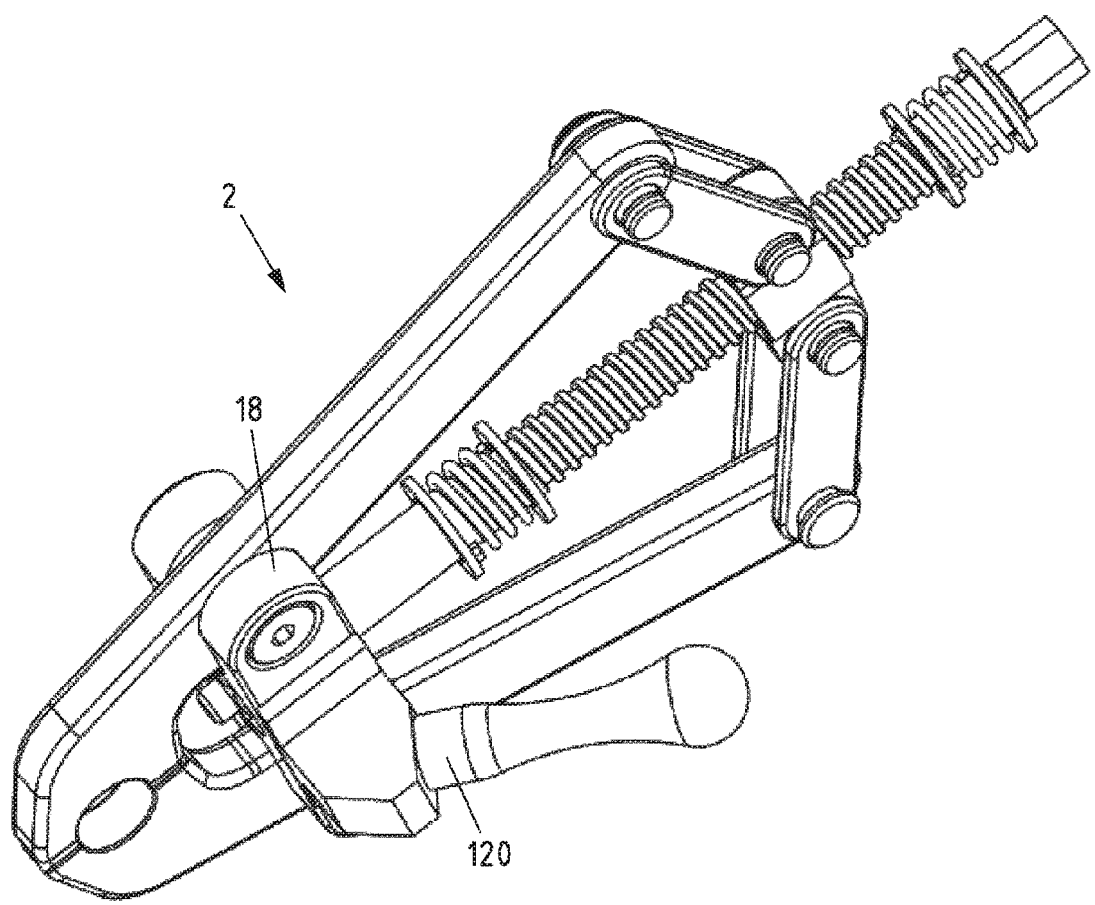

FIG. 8 shows another embodiment of a pressing device 2 with a handle 120 attached to the retaining element 18. This makes it easier for the user to handle the pressing tool.

Figure 9A:
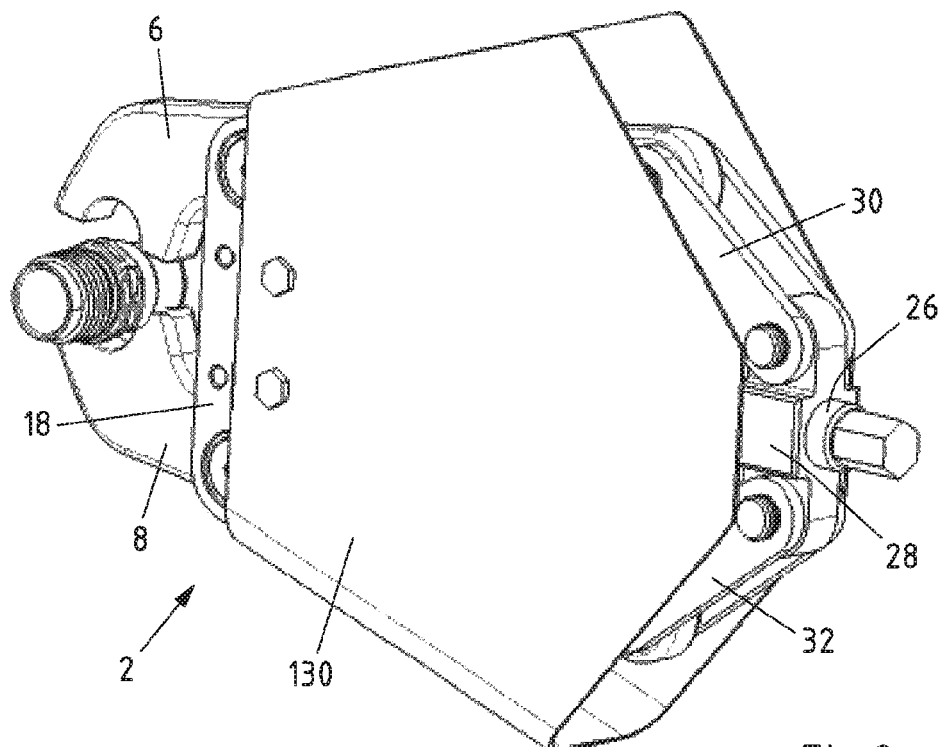
Figure 9B:
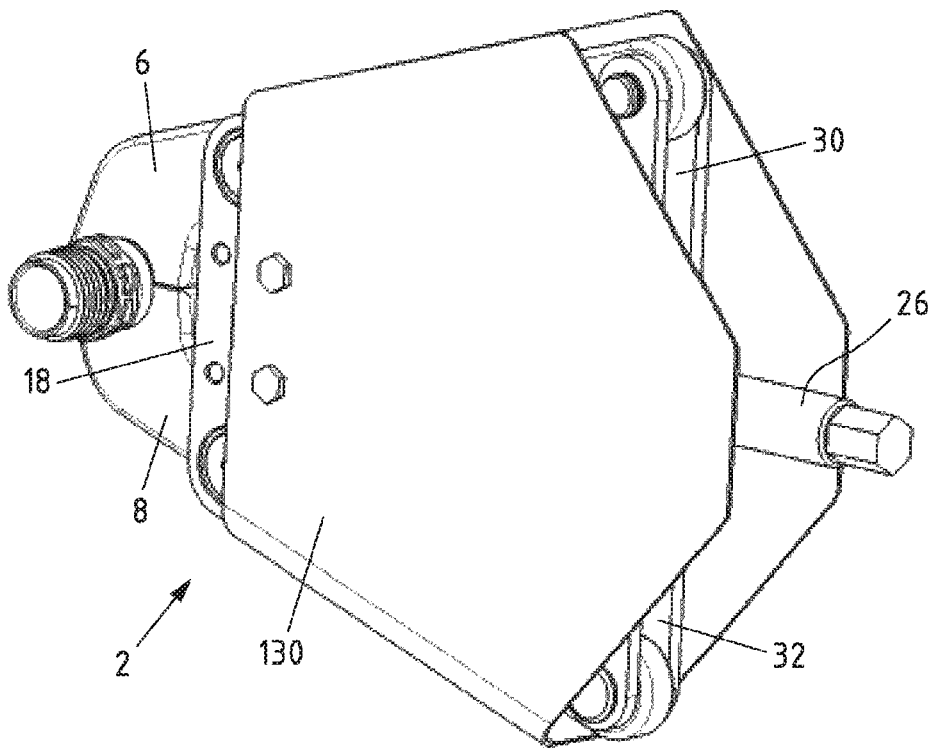

FIGS. 9a and 9b finally show an embodiment of a pressing device 2 with a housing 130, which at least partially surrounds, the pressing jaws 6, 8, the retaining element 18, actuator lever 30, 32 and the spindle nut 28 and thus also the actuator spindle 26. The housing 130 protects the user from unintentional reaching into the mechanics of the pressing device 2. If necessary, the handle 120 shown in FIG. 8 can also be connected to the housing 130.

FIG. 9a shows the pressing tool in an outer end position, in which the spindle nut 28 and the actuator levers 30, 32 protrude partially from the housing 130. In the press position shown in FIG. 9b, i.e. when the greatest forces are generated in the pressing device, the entire mechanics of the pressing device 2 are protected.

FIGS. 10 and 11 show embodiments of a pressing device 2 with a double freewheel, wherein the spindle nut 28 has a housing 140 and an inner nut 142 and wherein the spindle nut 28 is established for an overrunning clutch in two actuation directions. An overrunning clutch or also a freewheel is understood to be a clutch acting only in one direction of rotation. In the following, the term freewheel is used synonymously for overrunning clutch.

FIG. 10a-e show an embodiment with a double freewheel with a pulling inner nut 142, as described below. Within the 140 housing, the inner nut 142 is arranged so that it can rotate by means of several axially distributed bearings 144, whereby axial movement of the inner nut 142 relative to the 140 housing remains possible. The inner thread of the inner nut 142 engages with the external thread of the actuator spindle 26.

In addition, a first freewheel 146 and a second freewheel 148 are provided, each locking in one direction of rotation of the inner nut 142 relative to the housing 140 and releasing in the other direction of rotation, the locking and releasing of the two freewheels 146 and 148 being oppositely established.

At the axial ends, the inner nut 142 has a circumferential recess 150, 151, while the housing 140 has corresponding C-shaped clamping rings 152, 153 in an inner circumferential groove 154, 155. Thus the inner nut 142 can be held detachably in an axial position within the housing 140 by means of the clamping ring 152. This axial relative position can only be released by an axial force exceeding a threshold value, which, however, is not exceeded during a pressing stroke.

Figure 10A:
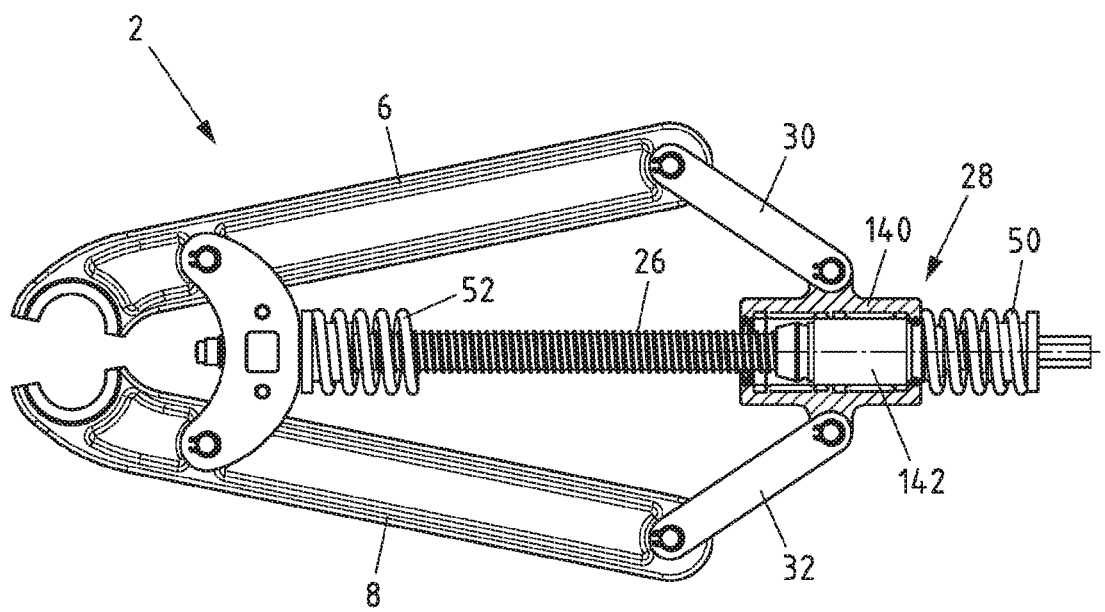
Figure 10B:
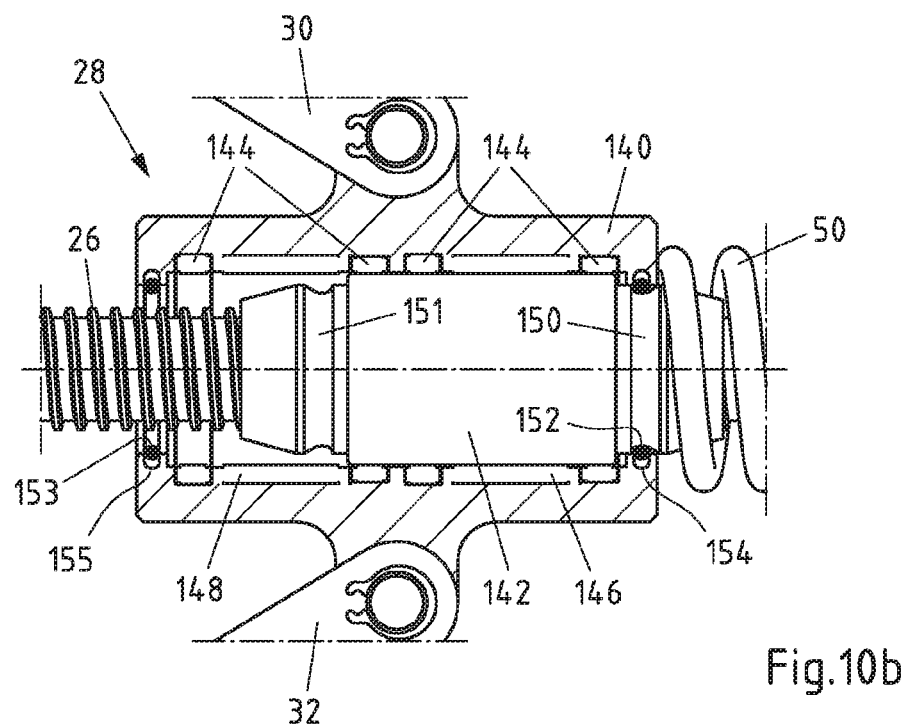

FIGS. 10a and 10b show the end position in which the housing 140 rests against the spring 50 and in which a new pressing stroke begins. The actuator spindle 26 is actuated for a rotary movement so that the inner nut 142, held and locked by the first freewheel 146, executes an axial movement, in FIG. 10b to the left. Thereby the inner nut 142 pulls the housing 140 in the same axial direction by means of the arrangement of recess 150, clamping ring 152 and groove 154. The pressing stroke is performed.

Figure 10C:
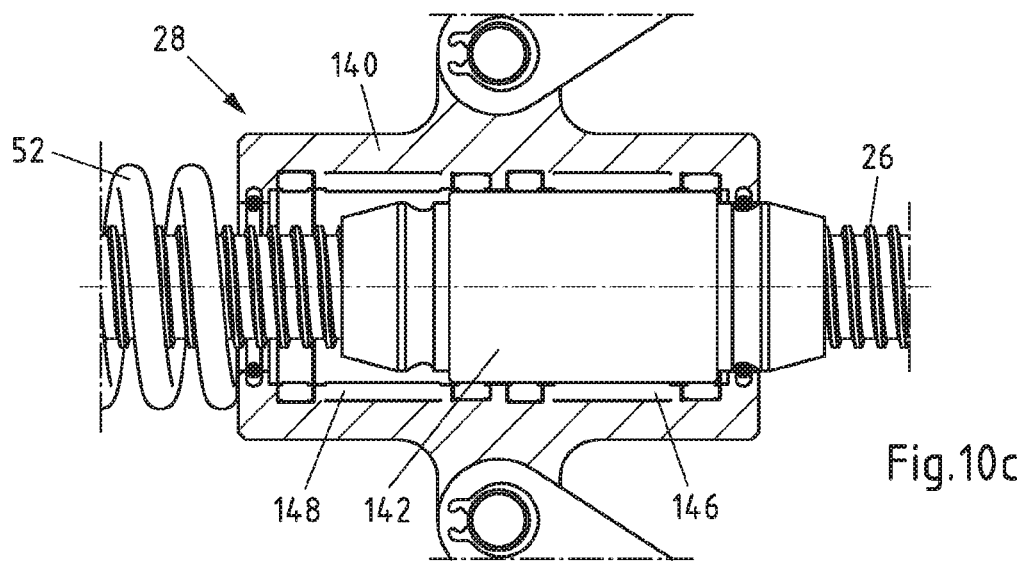

After passing through the press position, the position shown in FIG. 10c is reached in which the housing 140 comes into contact with the spring 52. Due to the continuous rotation of the actuator spindle 26, a counterforce is built up by the spring 52, whereby the threshold is overcome and the connection of the clamping ring 152 between the housing 140 and the inner nut 142 is released. The inner nut 142 continues to engage with the first freewheel 146 and moves axially relative to the housing 140, in FIG. 10c to the left.

Figure 10D:
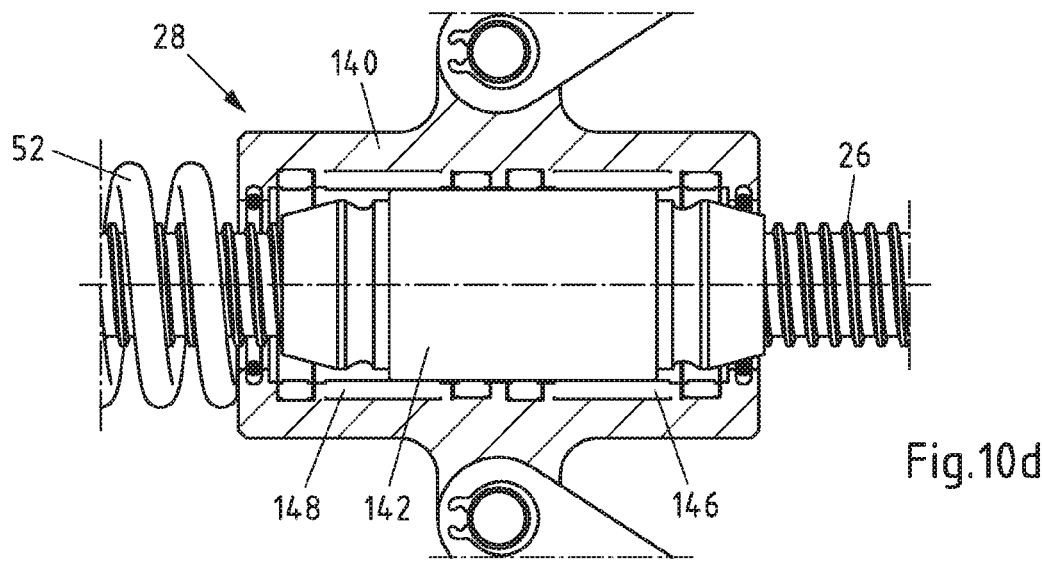
Figure 10E:
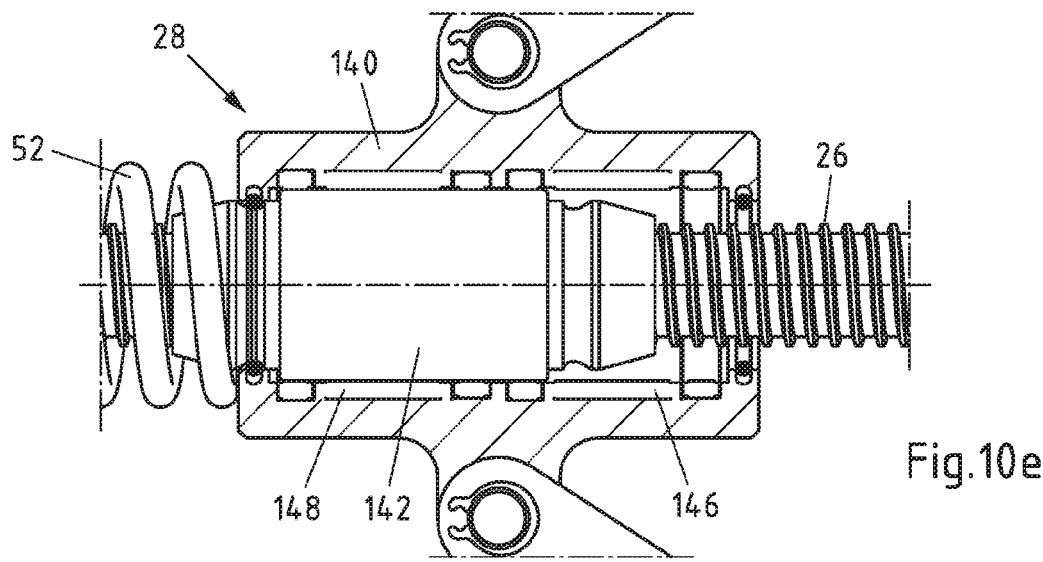

During the continued movement, the inner nut 142 engages with the second freewheel 148, as shown in FIGS. 10c and 10d. At the position reached in FIG. 10e, the clamping ring 155 engages with the recess 151 and connects the inner nut 142 again releasable with the housing 140. From this second end position a further pressing stroke can be started by an actuation of the actuator spindle in the opposite direction of rotation.

The axial locking of the inner nut 142 with the housing 140 is force-controlled and unlocked via the clamping ring. Spring-loaded thrust pieces can also be used. Mechanical or electronic release mechanisms are also conceivable which release the connection between inner nut 142 and housing 140 in the respective end position.

FIG. 11*a-e* shows an embodiment with a double freewheel with a sliding inner nut 142 arranged inside a housing 140 with axial stops 160 and 162. The actuator spindle 26 is established as in the embodiment according to FIG. 2 and has a central thread section 62 and two adjacent threadless cylinder sections 64 and 66.

As already shown in connection with FIG. 10, the inner nut 142 is rotatable arranged within the housing 140 by means of several axially distributed bearings 144, whereby an axial movement of the inner nut 142 relative to the housing 140 remains possible. The inner thread of the inner nut 142 engages with the external thread of the actuator spindle 26.

Furthermore, a first freewheel 146 and a second freewheel 148 are provided, each locking in one direction of rotation of the inner nut 142 relative to the housing 140 and releasing in the other direction of rotation, the locking and releasing of the two freewheels 146 and 148 being oppositely aligned.

Figure 11A:
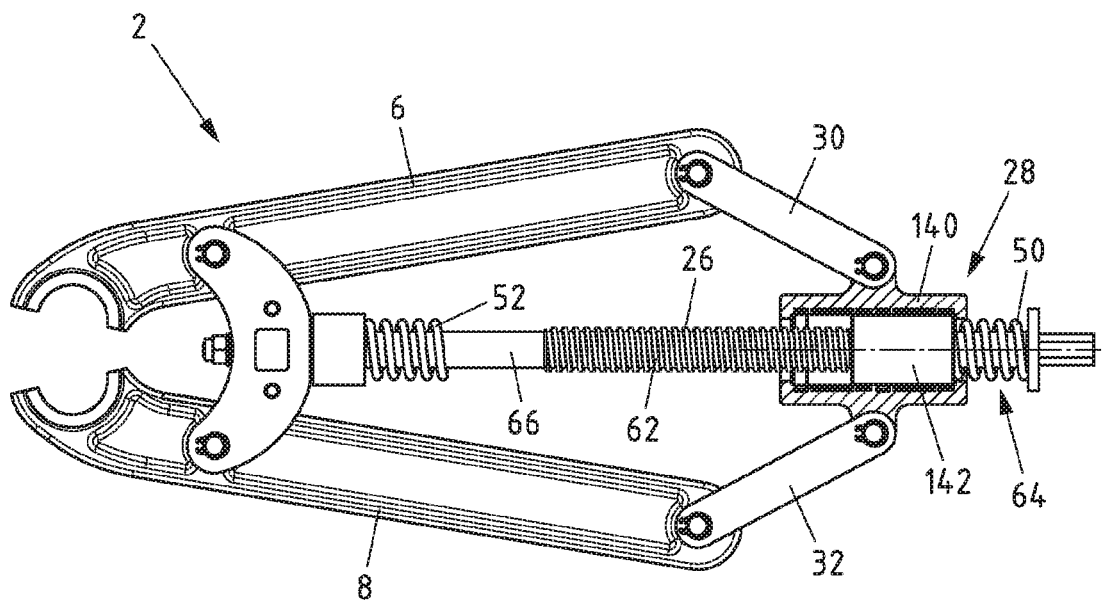
Figure 11B:
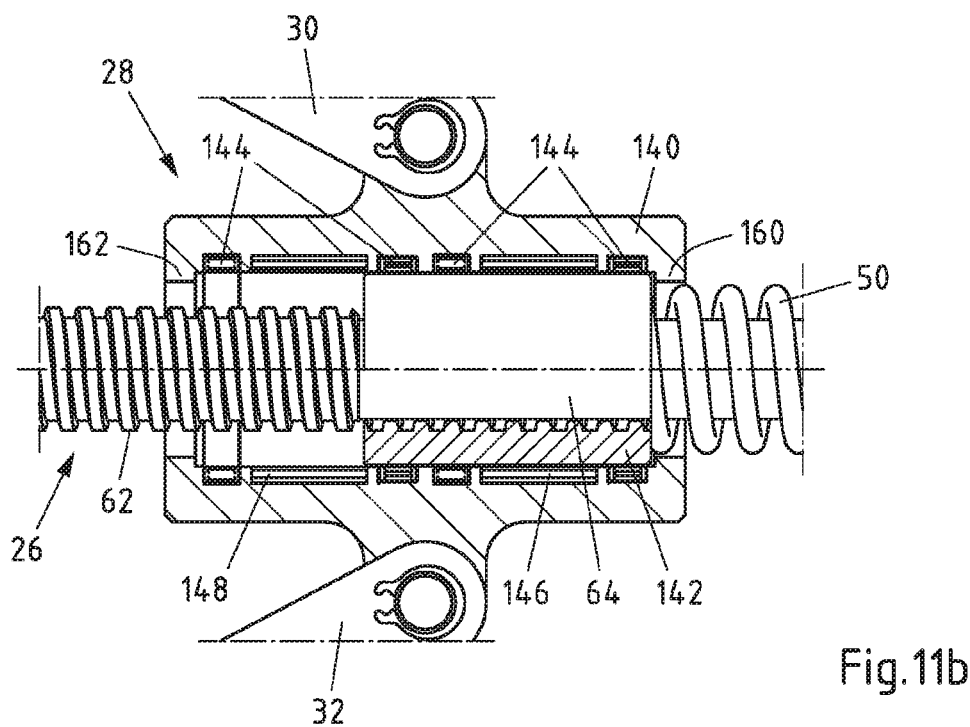
Figure 11C:
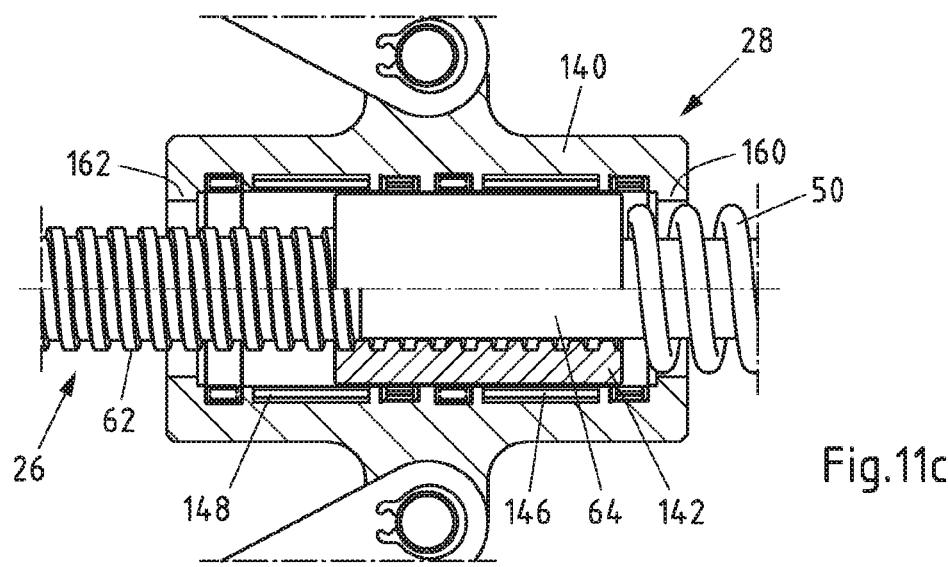

In the first end position shown in FIGS. 11*a* and 11*b*, the inner nut 142 is not engaged with the threaded section 62 and is located on the cylinder section 64. The spring 50 pushes the inner housing 142 toward the threaded section 62. By rotating the actuator spindle 26, the inner thread of the inner nut 142 engages with the threaded section 62, as shown in FIG. 11*c*. In this position, the inner nut 142 engages with the first freewheel, which locks against the actuation direction of the actuator spindle 26.

At the same time, the second freewheel 148 engages the inner nut 142, so that the inner nut 142 locks in the direction of actuation rotation by the freewheel 148. Thus the inner nut 142 moves further into the housing 140 until the inner nut 142 comes into contact with the stop 162. This position is shown in FIG. 11*d*.

Figure 11D:
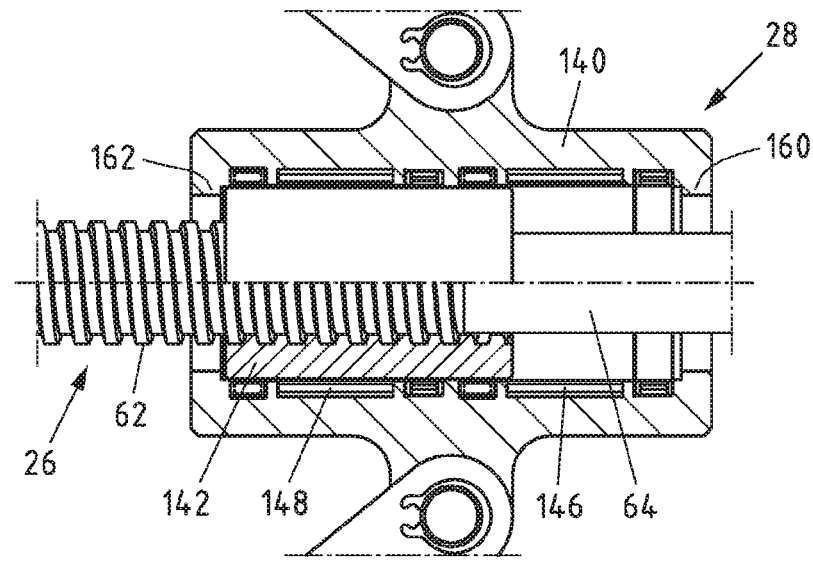
Figure 11E:
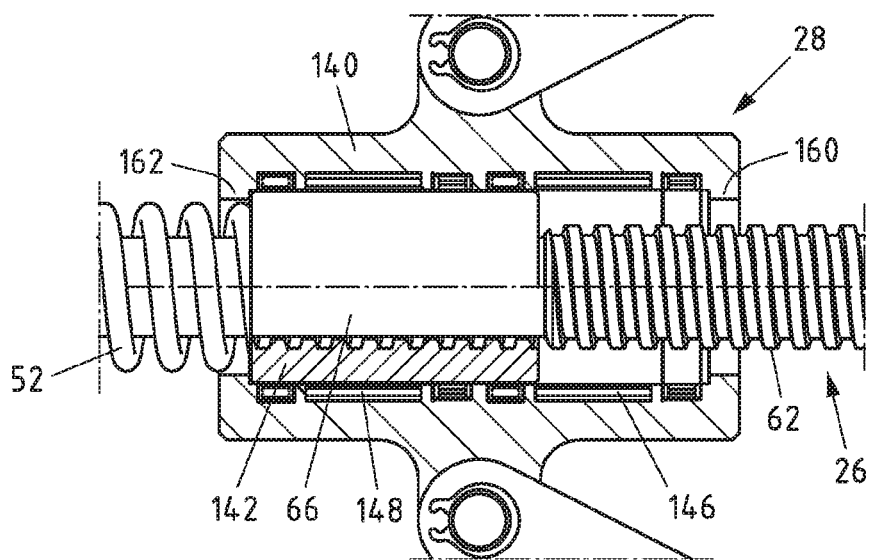

If the actuator spindle 26 is rotated continuously, the inner nut 142 presses the housing 140 over the stop 162 in the direction to the left in FIGS. 11*d* and 11*e* and thus performs the pressing stroke. If the direction of rotation of the actuator spindle 26 is changed prematurely, the second freewheel releases and the inner nut 142 rotates with the actuator spindle 26 on the spot without producing a backward or opening movement.

In the second end position shown in FIG. 11*e*, the inner thread of the inner nut 142 is disengaged from the thread section 62 and engages the cylinder section 66. In this position, a further rotation of the actuator spindle 26 will not cause further movement of the inner nut 142.

Starting from the second end position, a new pressing stroke can be performed by rotating the actuator spindle 26 in the reverse direction.

The invention claimed is:

1. A pressing tool for pressing fittings for the production of pipe connections comprising:
   two opposing pressing jaws which each have a pressing section and a lever section, and
   a retaining element for swivel connecting the pressing jaws,
   wherein the pressing sections form a receiving section and
   wherein pressing apart the lever sections causes the receiving section to close,
   wherein
   an actuator spindle, a spindle nut and at least two actuator levers are provided,
   wherein each actuator lever is swivel connected at one end to the lever section of a pressing jaw, and
   wherein each actuator lever is swivel connected at another end to the spindle nut,
   characterized in that,
   in a first end position of the spindle nut the receiving section is open,
   in a press position of the spindle nut the receiving section is closed,
   in a second end position of the spindle nut the receiving section is open,
   the actuator spindle has a threaded section and two subsequently attached threadless cylinder sections, and
   the spindle nut is disengaged from the threaded section when reaching at least one of the first end position and the second end position.

2. The pressing tool according to claim 1,
   characterized in that,
   a swiveling movement of the pressing jaws effects a symmetrical movement of the pressing sections.

3. The pressing tool according to claim 1,
   characterized in that,
   at least one spring stop is provided for the suspension of the movement of the spindle nut in at least one of the first end position and the second end position.

4. The pressing tool according to claim 1,
   characterized in that,
   at least one spring means is provided for a suspended connection of the spindle nut and the actuator levers and/or for a suspended connection between the actuator levers and the pressing jaws and/or between the retaining element and the pressing jaws.

5. The pressing tool according to claim 1,
   characterized in that,
   the actuator levers are C-shaped.

6. The pressing tool according to claim 1,
   characterized in that,
   the pressing jaws are connected to one another via a ratchet mechanism.

7. The pressing tool according to claim 1,
   characterized in that,
   the spindle nut comprises a housing and an inner nut and
   the spindle nut is configured for use with an overrunning clutch in two actuation directions.

8. A method for pressing fittings for producing pipe connections comprising:
   providing a pressing tool, the pressing tool comprising:
      two opposing pressing jaws which each have a pressing section and a lever section, and
      a retaining element for swivel connecting the pressing jaws,
      wherein the pressing sections form a receiving section and
      wherein pressing apart the lever sections causes the receiving section to close,
   wherein
      an actuator spindle, a spindle nut and at least two actuator levers are provided,
      wherein each actuator lever is swivel connected at one end to the lever section of a pressing jaw, and
      wherein each actuator lever is swivel connected at another end to the spindle nut,
   characterized in that,
      in a first end position of the spindle nut the receiving section is open,
      in a press position of the spindle nut the receiving section is closed, and in a second end position of the spindle nut the receiving section is open;
wherein the pressing tool is moved from the first end position via the press position to the second end position by applying a torque,
wherein in the first end position and in the second end position the receiving section is open, and
wherein in the press position the receiving section is closed.

9. The method according to claim 8,
in which the pressing tool is actuated alternately in two actuator actuation directions by opposite torques, and
in which after each change of the actuation direction a pressing of a fitting is performed.

10. The method according to claim 8,
in which the pressing jaws are suspended in the first end position and in the second end position.

11. The method according to claim 8,
in which the spindle nut is disengaged from a threaded section of the actuator spindle when reaching at least one of the first end position and the second end position.

12. The method according to claim 8,
in which a production tolerance of a pipe connection is compensated by a suspended connection and/or by a shape of the actuator levers, wherein the suspended connection is a connection between the pressing jaws, a connection between each actuator lever and each respective lever section and/or a connection between each actuator lever and the spindle nut.

13. The method according to claim 8,
in which an intermediate position, which is reached between the two end positions when the pressing tool is moved, is held by a ratchet mechanism.

14. The method according to claim 8,
in which a complete pressing of a pipe connection is achieved by using a double overrunning clutch.

15. A pressing tool for pressing fittings for the production of pipe connections comprising:
two opposing pressing jaws which each have a pressing section and a lever section, and
a retaining element for swivel connecting the pressing jaws,
wherein the pressing sections form a receiving section and
wherein pressing apart the lever sections causes the receiving section to close,
wherein
an actuator spindle, a spindle nut and at least two actuator levers are provided,
wherein each actuator lever is swivel connected at one end to the lever section of a pressing jaw, and
wherein each actuator lever is swivel connected at another end to the spindle nut,
characterized in that,
in a first end position of the spindle nut the receiving section is open,
in a press position of the spindle nut the receiving section is closed,
in a second end position of the spindle nut the receiving section is open, and
at least one spring means is provided for a suspended connection of the spindle nut and the actuator levers and/or for a suspended connection between the actuator levers and the pressing jaws and/or between the retaining element and the pressing jaws.

* * * * *